United States Patent
Ye et al.

(10) Patent No.: US 12,056,880 B2
(45) Date of Patent: Aug. 6, 2024

(54) METHOD OF CLASSIFYING LESION OF CHEST X-RAY RADIOGRAPH BASED ON DATA NORMALIZATION AND LOCAL PATCH AND APPARATUS THEREOF

(71) Applicant: Korea Advanced Institute of Science and Technology, Daejeon (KR)

(72) Inventors: JongChul Ye, Daejeon (KR); Sangjoon Park, Daejeon (KR); Yujin Oh, Daejeon (KR); Gwanghyun Kim, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 398 days.

(21) Appl. No.: 17/352,229

(22) Filed: Jun. 18, 2021

(65) Prior Publication Data
US 2022/0036564 A1  Feb. 3, 2022

(30) Foreign Application Priority Data

Aug. 3, 2020 (KR) .................. 10-2020-0096983
Mar. 8, 2021 (KR) .................. 10-2021-0030204
(Continued)

(51) Int. Cl.
*G06T 7/143* (2017.01)
*G06T 7/11* (2017.01)

(52) U.S. Cl.
CPC .............. *G06T 7/143* (2017.01); *G06T 7/11* (2017.01); *G06T 2207/10116* (2013.01);
(Continued)

(58) Field of Classification Search
CPC . G06T 7/143; G06T 7/11; G06T 2207/10116; G06T 2207/20004;
(Continued)

(56) References Cited

U.S. PATENT DOCUMENTS 10,691,980 B1 * 6/2020 Guendel ................... G06T 7/70
11,721,023 B1 * 8/2023 Kularathne .......... G06V 10/774
382/128
(Continued)

FOREIGN PATENT DOCUMENTS

JP       2019154943 A    9/2019
KR    1020190090986       11/2020
(Continued)

OTHER PUBLICATIONS

Wang, Hongyu, et al. "CheXLocNet: Automatic localization of pneumothorax in chest radiographs using deep convolutional neural networks." PLoS One 15.11 (2020): e0242013. (Year: 2020).*
(Continued)

*Primary Examiner* — Bobbak Safaipour
(74) *Attorney, Agent, or Firm* — Hamilton, Brook, Smith & Reynolds, P.C.

(57) ABSTRACT

Disclosed are a method of classifying lesions of chest x-ray radiographs based on data normalization and local patches and an apparatus thereof. The method includes converting an input chest x-ray radiograph into a normalized image, segmenting the converted normalized image into an organ area by using a first neural network based on a pre-learned segmentation model, generating local patches for the segmented organ area, and classifying a lesion in the input chest x-ray radiograph by using a second neural network based on a pre-learned classification model for the generated local patches.

18 Claims, 15 Drawing Sheets

(30) Foreign Application Priority Data

Mar. 26, 2021 (KR) ........................ 10-2021-0039509
Jun. 1, 2021 (KR) ........................ 10-2021-0070757

(52) U.S. Cl.
CPC ............... *G06T 2207/20004* (2013.01); *G06T 2207/20076* (2013.01); *G06T 2207/20081* (2013.01); *G06T 2207/20084* (2013.01); *G06T 2207/30061* (2013.01)

(58) Field of Classification Search
CPC . G06T 2207/20076; G06T 2207/20081; G06T 2207/20084; G06T 2207/30061; G06T 7/0014

See application file for complete search history.

(56) References Cited

U.S. PATENT DOCUMENTS

| | | | | |
|---|---|---|---|---|
| 2007/0086639 | A1* | 4/2007 | Sakaida | G06T 7/143 600/300 |
| 2008/0181481 | A1* | 7/2008 | Hong | G06T 7/12 382/132 |
| 2009/0110252 | A1* | 4/2009 | Baumgart | G06T 19/20 382/130 |
| 2011/0135181 | A1* | 6/2011 | Yan | G06T 7/12 382/173 |
| 2013/0011036 | A1* | 1/2013 | Marugame | H04N 1/60 382/128 |
| 2013/0223704 | A1* | 8/2013 | Lay | G06T 7/11 382/128 |
| 2020/0104990 | A1* | 4/2020 | Kimura | G16H 30/20 |
| 2020/0285917 | A1* | 9/2020 | Peng | G06V 30/274 |
| 2020/0293828 | A1* | 9/2020 | Wang | G06N 3/04 |
| 2021/0097690 | A1* | 4/2021 | Mostapha | G16H 30/20 |
| 2022/0028149 | A1* | 1/2022 | Prasad | G06T 15/205 |
| 2022/0309661 | A1* | 9/2022 | Ye | G06T 7/73 |
| 2023/0111306 | A1* | 4/2023 | Anand | G06T 7/0014 382/128 |
| 2023/0360359 | A1* | 11/2023 | Ahn | G06V 10/761 |

FOREIGN PATENT DOCUMENTS

| | | |
|---|---|---|
| KR | 1020200029171 | 1/2021 |
| KR | 1020200063364 | 2/2021 |

OTHER PUBLICATIONS

Chan, Yuan-Hao, et al. "Effective pneumothorax detection for chest X-ray images using local binary pattern and support vector machine." Journal of healthcare engineering 2018 (2018). (Year: 2018).*

Avni, Uri, et al. "X-ray categorization and retrieval on the organ and pathology level, using patch-based visual words." IEEE transactions on medical imaging 30.3 (2010): 733-746. (Year: 2010).*

Dosovitskiy, et al., "An Image is Worth 16×16 Words: Transformers for Image Recognition at Scale," published as a conference paper at ICLR 2021, arXiv:2010.11929v2 [cs.CV] Jun. 3, 2021.

Liu, Han et al. "SDFN: Segmentation-based Deep Fusion Network for Thoracic Disease Classification in Chest X-ray Images." Computerized medical imaging and graphics : the official journal of the Computerized Medical Imaging Society 75 (2018): 66-73.

Choi, et al., "Stargan v2: Diverse Image Synthesis for Multiple Domains," Proceedings of the IEEE/CVF Conference on Computer Vision and Pattern Recognition, pp. 8188-8197 (2020).

Oh, et al., "Deep Learning COVID-19 Features on CXR Using Limited Training Data Sets," IEEE Transactions on Medical Imaging (May 8, 2020).

* cited by examiner

METHOD OF CLASSIFYING LESION OF CHEST X-RAY RADIOGRAPH BASED ON DATA NORMALIZATION AND LOCAL PATCH AND APPARATUS THEREOF

CROSS-REFERENCE TO RELATED APPLICATIONS

A claim for priority under 35 U.S.C. § 119 is made to Korean Patent Application No. 10-2020-0096983 filed on Aug. 3, 2020, Korean Patent Application No. 10-2021-0030204 filed on Mar. 8, 2021, Korean Patent Application No. 10-2021-0039509 filed on Mar. 26, 2021, and Korean Patent Application No. 10-2021-0070757 filed on Jun. 1, 2021, in the Korean Intellectual Property Office, the entire contents of which are hereby incorporated by reference.

BACKGROUND

Embodiments of the inventive concept described herein relate to a technique for classifying lesions of chest x-ray radiographs, and more particularly, relate to a method and an apparatus thereof capable of classifying lesions of chest x-ray radiographs, for example, all viral pneumonia including COVID-19, based on data normalization and local patches, or quantifying the presumption and severity of infectious diseases such as COVID-19 by using a vision transformer that utilizes chest x-ray radiograph features Coronavirus disease 2019 (COVID-19) caused by severe acute respiratory syndrome Coronavirus 2 (SARSCoV-2) became a worldwide pandemic within 4 months after the initial report, and as of May 2, 2020, 3.3 million people are confirmed and 238,000 people died. Because of the highly contagious and lack of adequate treatments and vaccines, early detection of COVID-19 is becoming increasingly important to prevent further spread and to ensure adequate allocation of limited medical resources.

Currently, reverse transcription polymerase chain reaction (RT-PCR) for detecting a viral nucleic acid is standard in the diagnosis of COVID-19, but RT-PCR results using the nasopharynx and throat may be affected by sampling errors and low viral load. The antigen test may be quick, but it is less sensitive.

Because most COVID-19 infected patients have been diagnosed with pneumonia, radiographic testing may be useful in diagnosing and evaluating disease progression. At the initial patient labeling, chest computed tomography (CT) tests showed high sensitivity to RT-PCR, and COVID-19 infection was confirmed in negative or weakly positive RT-PCR cases. Therefore, the recent COVID-19 radiology literature has mainly focused on CT results. However, as the prevalence of COVID-19 increases, the daily use of CT puts a huge burden on radiology departments and causes potential infection of the CT set, so there has been increased a need to recognize COVID-19 shapes for chest X-rays (CXR).

Typical chest radiographic findings reflect findings described by CT, such as bilateral, peripheral consolidation and/or ground-glass opacities. In detail, the technique according to a conventional embodiment has described the frequent appearance of chest x-ray (CXR) in COVID-19, but it has been reported that the chest radiation test result has lower sensitivity than the initial RT-PCR test. Despite such low sensitivity, CXR abnormalities could be found in 9% of patients whose initial RT-PCR was negative.

Because the COVID-19 pandemic has a risk of overwhelming medical systems worldwide, CXR may be considered as a tool to identify COVID-19 when diagnostic performance using CXR is improved. Although CXR cannot completely replace RT-PCR, because the signs of pneumonia are clinical manifestations of high-risk patients requiring hospitalization, the CXR may be used for patient classification, so that it is possible to prioritize patient care to aid a saturated medical system in a pandemic situation. This is of particular importance because the most frequently known etiology of community-acquired pneumonia is generally bacterial infection. By excluding residents through classification, limited medical resources may be saved considerably.

Thus, a deep learning (DL) approach to chest radiation for COVID-19 classification has been explored. In particular, the technology of one conventional embodiment proposed an open source deep convolution network platform called COVIDNet customized to detect COVID-19 cases in chest x-ray radiographs. The technology asserted that the COVID-Net could achieve a good sensitivity of 80% for COVID-19 cases.

Quantification of the severity of COVID-19 and localization of the lesion for CXR may be also useful in the process of follow-up of the diagnosed patient and decision of the treatment plan. Pixel-level labeling is usually useful for quantifying and localizing the severity based on deep learning, but a lot of time and labor may be consumed to construct a data set containing such a label. Therefore, after segmenting the chest into six areas, an array-type labeling technique was introduced in which '1' or '0' is assigned to the six areas depending on the presence or absence of a COVID-19-related lesion. A deep learning-based approach technique was proposed to quantify the severity of COVID-19 and localize a lesion based on the data set constructed using such a type of labeling.

In order to develop a neural network technology for diagnosing infectious diseases using a simple chest x-ray radiograph, large-scale learning data is essential, and it is possible to increase performance such as accuracy, sensitivity, and the like as learning is performed using single organic data that has undergone a consistent pre-processing process. However, there is a limit to constructing such a consistently refined multi-organic data set in a situation where infectious diseases are prevalent around the world. Therefore, in reality, it is essential to learn by using pre-constructed data sets or using data sets obtained from various sources. However, when artificial neural networks are trained in such a manner, the performance drops sharply in an unseen data set, and generalization performance degradation and overfitting may occur, in which performance is good only on the data set used for learning.

SUMMARY

Embodiments of the inventive concept provide a method of classifying a lesion of a chest x-ray radiograph, for example, COVID-19 based on data normalization and local patching, and an apparatus thereof.

Embodiments of the inventive concept provide a method of visualizing a classified lesion on a chest x-ray radiograph based on a probabilistic weight, and an apparatus thereof.

Embodiments of the inventive concept provide a method and an apparatus capable of quantifying the estimation and severity of an infectious disease, for example, COVID-19 using a vision transformer utilizing chest x-ray radiographic features.

Embodiments of the inventive concept provide a method and an apparatus capable of, after learning to classify a low-level feature in a pre-built large public data set, quantifying the degree of severity in an image estimated as COVID-19 by obtaining feature maps from such a learned model and combining them using a vision transformer.

Embodiments of the inventive concept provide a method and an apparatus capable of segmenting organ areas in abnormal lung and normal lung by using one neural network based on adaptive instance normalization (AdaIN) in chest x-ray radiographs.

According to an exemplary embodiment, a method of classifying a lesion of a chest x-ray radiograph includes converting an input chest x-ray radiograph into a normalized image, segmenting the converted normalized image into an organ area by using a first neural network based on a pre-learned segmentation model, generating local patches for the segmented organ area, and classifying a lesion in the input chest x-ray radiograph by using a second neural network based on a pre-learned classification model for the generated local patches.

The converting of the input chest x-ray radiograph may include converting the input chest x-ray radiograph into the normalized image by performing gamma correction in an image area.

The converting of the input chest x-ray radiograph may include converting the input chest x-ray radiograph into the normalized image by uniformly normalizing heterogeneity between data while emphasizing contrast between signal intensities of different organs by utilizing a feature of the gamma correction.

The generating of the local patches may include generating an organ image for the segmented organ area by using the segmented organ area and the normalized image, and generating the local patches based on a lung area of the generated organ image.

The classifying of the lesion may include classifying a most classified lesion among lesion classification results for each of the generated local patches as a final lesion.

The method may further include visualizing the classified lesion by applying a probabilistic weight to a Saliency map after obtaining the probabilistic weight from each of the local patches corresponding to the classified lesion.

The visualizing of the classified lesion may include visualizing the classified lesion by using a gradient weighted class activation map.

The segmenting of the converted normalized image may include segmenting the organ area from the normalized image by using the first neural network learned in advance with adaptive instance normalization.

The first neural network may learn a first adaptive instance normalization code for converting an abnormal lung into a normal lung in a domain adaptation scheme after learning lung area segmentation in a normal lung based on a supervised learning technique, and may perform learning through a self-supervised learning scheme by distilling knowledge learned through the supervised learning and the domain adaptation scheme into a second adaptive instance normalization code, thereby integrating the domain adaptation and the segmentation to segment the organ area from each of the normal lung and the abnormal lung.

According to another exemplary embodiment, a method of classifying a lesion of a chest x-ray radiograph includes segmenting an input chest x-ray radiograph into an organ area by using a first neural network based on a pre-learned segmentation model, generating local patches for the segmented organ area, and classifying a lesion in the input chest x-ray radiograph by using a second neural network based on a pre-learned classification model for the generated local patches.

According to still another exemplary embodiment, an apparatus for classifying a lesion of a chest x-ray radiograph includes a normalization unit that converts an input chest x-ray radiograph into a normalized image, a segmentation unit that segments the converted normalized image into an organ area by using a first neural network based on a pre-learned segmentation model, a generation unit that generates local patches for the segmented organ area, and a classification unit that classifies a lesion in the input chest x-ray radiograph by using a second neural network based on a pre-learned classification model for the generated local patches.

The normalization unit may convert the input chest x-ray radiograph into the normalized image by performing gamma correction in an image area.

The normalization unit may convert the input chest x-ray radiograph into the normalized image by uniformly normalizing heterogeneity between data while emphasizing contrast between signal intensities of different organs by utilizing a feature of the gamma correction.

The generation unit may generate an organ image for the segmented organ area by using the segmented organ area and the normalized image and generate the local patches based on a lung area of the generated organ image.

The classification unit may classify a most classified lesion among lesion classification results for each of the generated local patches as a final lesion.

The apparatus may further include a visualization unit configured to visualize the classified lesion by applying a probabilistic weight to a Saliency map after obtaining the probabilistic weight from each of the local patches corresponding to the classified lesion.

The visualization unit may visualize the classified lesion by using a gradient weighted class activation map.

The segmentation unit may segment the organ area from the normalized image by using the first neural network learned in advance with adaptive instance normalization.

According to still another exemplary embodiment, a method of classifying a lesion of a chest x-ray radiograph includes converting an input chest x-ray radiograph into a normalized image, segmenting the converted normalized image into an organ area by using a first neural network based on a pre-learned segmentation model, generating local patches for the segmented organ area, and classifying a lesion in the input chest x-ray radiograph by using a second neural network based on a pre-learned classification model for the generated local patches and classifying a most classified lesion among lesion classification results for each of the generated local patches as a final lesion.

According to still another exemplary embodiment, a method of quantifying lesion severity based on a vision transformer includes receiving an input chest x-ray radiograph; extracting a feature map from the received input chest x-ray radiograph by using a pre-learned neural network; classifying a lesion from the input chest x-ray radiograph by using a vision transformer based on the extracted feature map; and quantifying severity of the lesion based on the extracted feature map and the classified lesion.

The extracting of the feature map may include, after converting the received input chest x-ray radiograph into a normalized image, extracting the feature map from the normalized image by using the neural network.

The quantifying of the severity may include generating a lesion probability map based on the extracted feature map and the classified lesion, and quantifying the severity of the lesion by using the generated lesion probability map.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
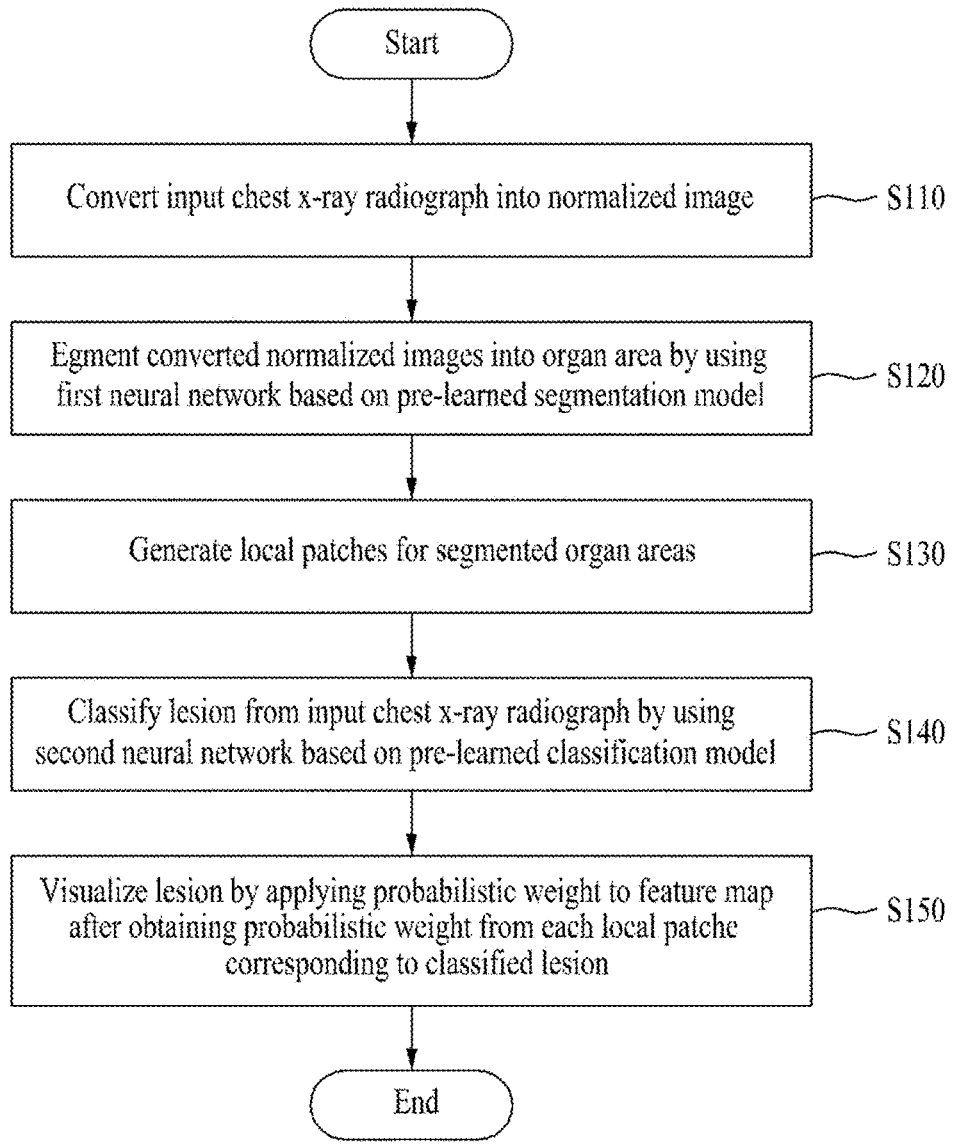
FIG. 1 is a flowchart illustrating a method of classifying a lesion of a chest x-ray radiograph according to an embodiment of the inventive concept.

Advantages and features of embodiments of the inventive concept, and method for achieving thereof will be apparent with reference to the accompanying drawings and detailed description that follows. But, it should be understood that the inventive concept is not limited to the following embodiments and may be embodied in different ways, and that the embodiments are given to provide complete disclosure of the inventive concept and to provide thorough understanding of the inventive concept to those skilled in the art, and the scope of the inventive concept is limited only by the accompanying claims and equivalents thereof.

The terms used in the present specification are provided to describe embodiments, not intended to limit it. Singular forms are intended to include plural forms unless the context clearly indicates otherwise. It will be further understood that the terms "comprises," and/or "comprising," used herein, specify the presence of stated steps, operations, and/or components, but do not preclude the presence or addition of one or more other steps, operations, and/or components.

Unless otherwise defined, all terms used herein (including technical or scientific terms) have the same meanings as those generally understood by those skilled in the art to which the inventive concept pertains. Such terms as those defined in a generally used dictionary are not to be interpreted as having ideal or excessively formal meanings unless defined clearly and specifically.

Hereinafter, exemplary embodiments of the inventive concept will be described in detail with reference to the accompanying drawings. The same reference numerals are used for the same components in the drawings, and duplicate descriptions of the same components are omitted.

Under the global pandemic of COVID-19, the use of artificial intelligence to analyze chest x-ray radiographs and patient classification for COVID-19 diagnosis is becoming important. Unfortunately, due to the urgent nature of the COVID-19 pandemic, systematic collection of CXR data sets for deep neural network training is difficult.

Embodiments of the inventive concept are provided to classify lesions in chest x-ray radiographs based on data normalization and local patching.

In this case, the inventive concept may minimize the limitation of generalization that occurs due to heterogeneity between data and overfitting of a model in a situation where the amount of purified data is insufficient, based on data normalization and local patching.

Furthermore, the inventive concept may perform gamma correction in an image domain in order to uniformly normalize heterogeneity occurring in small unrefined data, and may uniformly normalize the heterogeneity between data while emphasizing the contrast between signal intensities of different organs by utilizing the features of gamma correction, so that it is possible to ensure stable organ segmentation and lesion classification neural network performance by using unrefined data.

Furthermore, the inventive concept may first segment the lung area through organ segmentation of a chest x-ray radiograph, generate a random local patch based on the segmented lung area, and secure stable performance even with small data through lesion classification based on information obtained from each patch. In addition, the inventive concept may effectively visualize multiple lesions by obtaining a probabilistic weight from each local patch in which the lesion is classified and then applying the probabilistic weight to a Saliency map.

The inventive concept will be described with reference to FIGS. 1 to 5.

FIG. 1 is a flowchart illustrating a method of classifying a lesion of a chest x-ray radiograph according to an embodiment of the inventive concept.

Referring to FIG. 1, in operations S110 and S120, a method of classifying an infectious disease of a chest x-ray radiograph according to an embodiment of the inventive concept converts an input chest x-ray radiograph into a normalized image, and with respect to the converted normalized image, segments the organ area by using a first neural network based on a pre-learned segmentation model, for example, an organ segmentation neural network.

In this case, in operation S110, the input chest x-ray radiograph may be converted into a normalized image by performing gamma correction in the image area of the input chest x-ray radiograph. For example, in operation S110, the input chest x-ray radiograph may be converted into a normalized image by using the characteristics of gamma correction and uniformly normalizing the heterogeneity between data while emphasizing the contrast between signal intensities of different organs.

When the organ area is segmented in operation S120, in operations S130 and S140, local patches for the segmented organ areas are generated, and for the generated local patches, lesions are classified from the input chest x-ray radiograph by using a second neural network based on a pre-learned classification model, for example, a lesion classification neural network.

In this case, in operation S130, an organ image for the segmented organ area may be generated by using the segmented organ area and the normalized image, and local patches may be generated based on the lung area of the generated organ image.

In this case, in operation S140, the most classified lesion among the lesion classification results for each of the generated local patches may be classified as the final lesion.

When a lesion is classified in the input chest x-ray radiograph in operation S140, in operation S150, a probabilistic weight is obtained from each of the local patches corresponding to the classified lesion and then applied to the Saliency map, thereby visualizing the lesion.

In this case, in operation S150 the classified lesion may be visualized by using a gradient weighted class activation map.

The method of the inventive concept will be described in detail with reference to FIGS. 2 to 4 as follows.

The inventive concept may provide a neural network architecture which is suitable for training with limited training data sets and still draws radiologically interpretable results. Because the distribution pattern of COVID-19 most often observed in chest x-ray radiograph (CXR) is bilateral involvement, peripheral distribution and ground-glass opacification (GGO), the inventive concept should reflect these radiological results.

To this end, the inventive concept may investigate several image biomarkers frequently used in CXR analysis, such as lung area intensity distribution, cardiothoracic ratio, and the like.

Network Architecture

Figure 2:
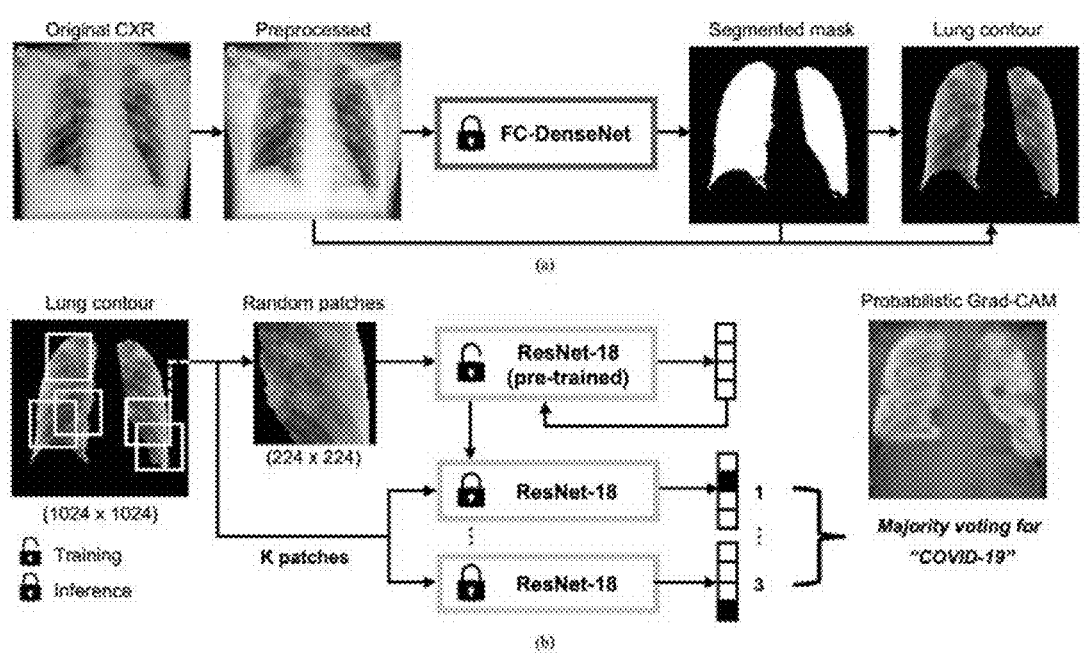
FIG. 2 is an exemplary diagram illustrating a neural network structure for performing a method according to the inventive concept.
Figure 3:
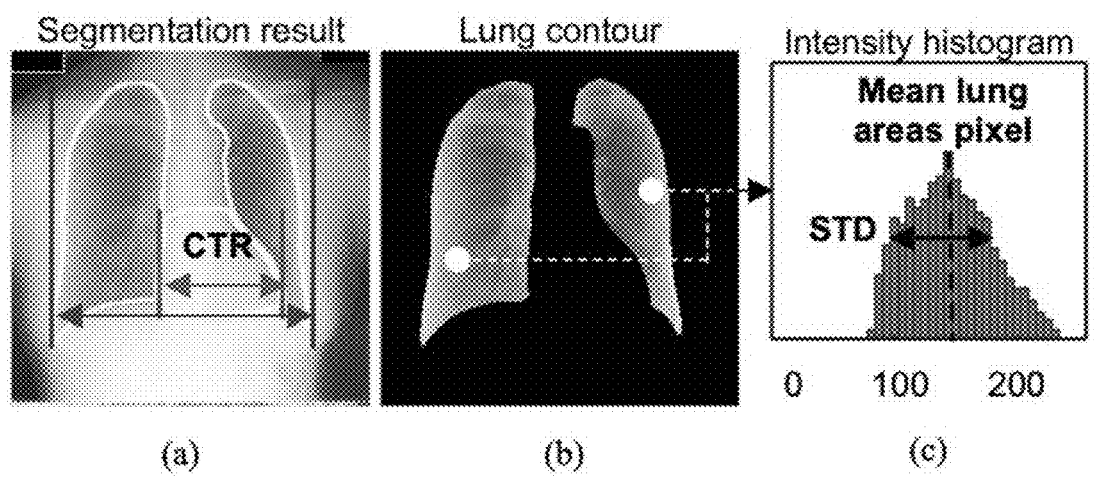
FIG. 3 is an exemplary diagram for explaining the statistical analysis of a potential CXR COVID-19 marker.

FIG. 2 is an exemplary diagram illustrating a neural network structure for performing a method according to the inventive concept. As shown in FIG. 2, the CXR image is first preprocessed for data normalization, and then the preprocessed data are provided to a pre-trained segmentation model-based segmentation network (FC-DenseNet). In addition, as shown in FIG. 2A, the lung area may be extracted. The corresponding disease is classified using training and inference for each patch using a classification network from the segmented lung area, and then, a final decision is made based on majority voting as shown in FIG. 2B. In addition, a probabilistic Grad-CAM Saliency map is calculated to provide an interpretable result. Hereinafter, each network will be described in detail. In this case, the majority voting is to classify the most classified disease, lesion, or infectious disease as the final disease in the classification results of the classification network for each of the local patches, and each disease may be provided by probabilistic classification according to a situation.

Segmentation Network

The segmentation network, which is a neural network for extracting lung and heart contours from a chest x-ray radiograph, may use a fully expanded fully convolutional (FC)-DenseNet103 to perform semantic segmentation. The segmentation network training may be expressed as following Equation 1.

$$\operatorname*{argmin}_{\Theta} \mathcal{L}(\Theta) \qquad \text{[Equation 1]}$$

Where $\mathcal{L}(\theta)$ denotes the cross entropy loss of multi-category semantic segmentation, $\theta$ denotes a network parameter set composed of a filter kernel weight and a bias, and $\mathcal{L}(\theta)$ may be expressed as following Equation 2.

$$\mathcal{L}(\Theta) = -\sum_{s}\sum_{j} \lambda_s \mathbb{1}(y_j = s)\log(p_\Theta(x_j)) \qquad \text{[Equation 2]}$$

Where l(•) denotes an indication function, $p_\theta(x_j)$ denotes a softmax probability of the j-th pixel in the CXR image 'x', $y_j$ denotes a corresponding ground truth label, and 's' denotes a class category, that is, s∈ {background, heart, left lung, right lung}, and As may mean a weight given to each class category.

The CXR images of different data set resources may cause heterogeneity in bit depth, compression type, image size, acquisition condition, scanning protocol, post-processing, and the like. Therefore, a general-purpose pretreatment operation for data normalization is developed to ensure a histogram of uniform intensity across the entire data set. The detailed pretreatment operation is as follows.

1) Data type selection (uint8/uint16 to float32)
2) Histogram smoothing (gray level=[0, 255.0])
3) Gamma correction (y=0.5)
4) Image size adjustment (height, width=[256,256])

FC-DenseNet103 may be trained with a backbone segmentation network architecture by using the preprocessed data, and the network parameters may be initialized by a random distribution. In this case, an Adam optimizer with an initial learning rate of 0.0001 may be applied. Whenever the training loss is not improved by a certain criterion, the learning rate may be reduced by factor 10, and an early stopping strategy may be adopted based on the outcome of the verification. The batch size may be optimized to '2', and the network may be implemented by using the PyTorch library.

Classification Network

The classification network, which is a network that classifies chest x-ray radiographs according to the type of disease, may adapt a relatively simple ResNet-18 as the backbone of the classification algorithm for two reasons. First, overfitting is to be prevented. This is because overfitting may occur when using an overly complex model for a small number of data. Second, the inventive concept performs movement learning with pre-trained weights in ImageNet to compensate for a small training data set. This strategy of the inventive concept may make the training stable even when the data set size is small.

The label may be classified into four grades, such as normal, bacterial pneumonia, tuberculosis (TB), viral pneumonia including pneumonia caused by COVID-19 infection. Because the pneumonia has been reported to have a similar radiographic shape that is difficult even for an experienced radiologist, the inventive concept may assign the same class to viral pneumonia (e.g., SARS-cov, MERS-cov, and the like) different from the virus of COVID-19. In addition, it is possible to distinguish bacterial pneumonia or tuberculosis from viral pneumonia which shows significant differences in the shape of radiation and is still useful for patient classification.

The preprocessed image is first masked with a chest mask of the segmentation network and then provided to the classification network. The classification network may be implemented in two different versions of the global approach and the local approach. In the global approach, the masked image may be scaled to 224×224 to provide the masked image to the network. The global approach may focus on the global appearance of CXR data and be used as a reference network for comparison. Indeed, many of the existing studies employ similar procedures.

In the local patch-based approach which is a method according to the inventive concept, the masked image may be randomly cropped to a size of 224×224, and the result patch may be used as a network input as shown in FIG. 2B. In contrast to the global approach, various CXR images may be resized to much larger 1024×1024 images so that the classification network better reflects the original pixel distribution. Accordingly, the segmentation mask shown in FIG. 2A is upsampled to match the 1024×1024 image size. In order to prevent the patch from being cut in the blank area of the masked image, the center of the patch may be arbitrarily selected within the lung area. During inference, in order to represent the overall attributes of the entire image, K patches may be obtained randomly for each image, and K patches may be selected several times to sufficiently cover all chest pixels. Thereafter, each patch may be provided to the network to generate a network output, and a final decision may be made based on majority voting among the K network outputs. That is, the class that is most often declared may be regarded as the final result as shown in FIG. 2B. For example, in the inventive concept, the number of random patches 'K' may be set to 100, which may mean that 100 patches are randomly generated from one entire image for majority voting.

In the case of network training, the pre-trained parameters of ImageNet may be used for network weight initialization, and then the network may be trained using CXR data. As an optimization algorithm, the Adam optimizer with a learning rate of 0.00001 may be applied. The network may be trained at 100 epochs while adopting an early stop strategy based on the verification performance metrics, and a batch size of 16 may be used. In order to prevent the overfitting problem, weight reduction and L1 normalization may be applied, and the classification network may be implemented with the Pytorch library.

Probabilistic Grad-CAM Feature Map Visualization

According to the inventive concept, the feature map may be visualized to investigate the interpretability of the approach. One of the most widely used feature map visualization schemes is the so-called gradient weighted class activation map (Grad-CAM). In particular, the Grad-CAM feature map of class 'c' for a given input image $x \in R^{m \times n}$ may be expressed as following Equation 3.

$$l^c(x) = UP\left(\sigma\left(\sum_k \alpha_k^c f^k(x)\right)\right) \in R^{m \times n} \quad \text{[Equation 3]}$$

Where $f^k(x) \in R^{u \times v}$ means the last convolutional layer (e.g., layer '4' of ResNet-18), UP(•) means an up-sampling operator up to an m×n image in an U×V feature map, σ(•) means a rectified linear unit (ReLU), and $\alpha_k^c$ means to the feature weight parameter for class 'c'. The feature weight parameter for class 'c' may be obtained through following Equation 4.

$$\alpha_k^c = \frac{1}{Z}\sum_{i=1}^{uv} \frac{\partial y_c}{\partial f_i^k} \quad \text{[Equation 4]}$$

Where 'Z' means a scaling parameter, yc means a score for class 'c' before the softmax layer, and $f_i^k$ means an i-th pixel value of $f^k(x)$.

Grad-CAM feature map lc may be normalized to have a value of [0, 1], and Grad-CAM for the global approach may be used as a reference feature map.

However, because each patch has a different score for the COVID-19 class, it is required to be careful of applying Grad-CAM to the local patch-based approach. Therefore, in order to obtain a global feature map, in the case of a patch-applied Grad-CAM feature map, a weight is assigned according to the estimated probability of a corresponding class and an average value is calculated. In more detail, the probabilistic Grad-CAM for the input image $x \in R^{m \times n}$ may have a value as shown in following Equation 5 at the i-th pixel position.

$$[l^c_{prob}(x)]_i = \frac{1}{K_i}\left[\sum_{k=1}^{K} r^c(x_k)Q_k(l^c(x_k))\right]_i \quad \text{[Equation 5]}$$

Where $xk \in R^{p \times q}$ means the k-th input patch, $Qk: R^{p \times q} \to R^{m \times n}$ means an operator by which the k-th patch of size p×q is copied to the appropriate location of the zero-padding image in relation to the input patch, $l^c(xk) \in R^{p \times q}$ means the Grad-CAM calculated by Equation 3 for the input patch $xk \in R^{p \times q}$, and $K_i$ means the number of frequencies of the i-th pixel in the entire K patch.

In addition, the class probability $r^c(xk)$ for the k-th patch may be easily calculated after the softmax layer. Accordingly, when constructing a global feature map, an average probability of each pixel belonging to a given class in Equation 5 may be considered.

Data Set

The inventive concept may use a public CXR data set, for example, a JSRT/SCR data set, whose features are summarized. In this case, specific CXR data that may use the actual segmentation mask among public CXR data may be used for training and verification of the segmentation network.

In particular, according to the inventive concept, because a ground-truth partitioning mask is usable, a training data set may be used for training and verification of the segmentation network. In addition, the classification network data set may include some data from the segmentation network data set, as well as other COVID-19 resources used for training, validation, and testing of the classification network. Details of the data set are as follows.

1) Segmentation network data set: The JSRT data set was published by the Japanese Society for Radiation Technology (JSRT), and a total of 247 cases of chest posteroanterior (PA) radiation were collected from 14 organs, including normal and pulmonary nodules. The corresponding segmentation mask may be collected from the SCR database. The JSRT/SCR data set may be randomly segmented into training (80%) and verification (20%), and for cross-database validation, the inventive concept may use another public CXR data set such as the Montgomery Country (MC) data set collected by the U.S. National Library of Medicine (US-NLM). Chest PA radiography may collect a total of 138 cases including normal, tuberculosis patients, the corresponding lung division mask, and the like.

2) Classification network data set: The data set resource for the classification network may include, in a general case, the JSRT data set and the NLM data set of the segmentation validation data set. To compare COVID-19 with normal and different lung diseases, data may be collected from other sources, which may include additional normal cases. The data set may be sufficiently accessible by any study group and may be selected because the data set provides a detailed diagnosis of the disease on the label. Thus, pneumonia may be more specifically classified into bacterial pneumonia and viral pneumonia, which must be classified separately because clinical and radiographic differences are clear.

More than 80% of the data collected in the published data set is the pediatric CXR of the Guangzhou Women's Children's Medical Center, and the pediatric CXR images may be excluded to avoid the neural network learning features biased from age-related features. This is because CXR radiography with an unbiased age distribution is intended to be used for a more accurate assessment of the deep neural network for the classification of COVID-19.

The total data set may be classified into five grades: normal, pulmonary tuberculosis, bacterial pneumonia, viral pneumonia, and COVID-19 pneumonia. For example, a total of 180 radiographic images of 118 subjects in the COVID-19 imaging data collection may be included, and in the cases of normal, bacterial pneumonia, and viral pneumonia (not including COVID-19), each may use a total of 322 chest x-ray radiographs including 191, 54 and 20 images, respectively. The combined data set may be randomly segmented into training, validation and test sets at a ratio of 0.7, 0.1 and 0.2.

3) Data set for comparison with COVID-Net: A separate data set may be used to compare the method of the inventive concept with an existing state of the art (SOTA) algorithm called COVID-Net. The COVID-19 image data collection was combined with the RSNA pneumonia detection challenge data set to fairly compare the method of the inventive concept with the COVID-Net. The reason why the network is trained separately with the COVID-Net data set is that the RSNA pneumonia detection challenge data set provides only information on the presence or absence of pneumonia rather than a detailed diagnosis of the disease. Therefore, the label is segmented into only three categories: normal, pneumonia, and COVID-19. In detail, in the RSNA pneumonia detection challenge data set, there were 8,851 normal radiographic images of 13,645 patients and 6,012 chest x-ray radiographs of pneumonia, and these images were combined with COVID-19 image data collection to create a total data set. Among them, 100 normal, 100 pneumonia and 10 COVID-19 images may be randomly selected for validation and test sets. Although classified as normal, bacterial, tuberculosis, or viral, COVID-19 cases may be more correlated with radiographic findings and may be practically useful in a clinical setting.

Statistical Analysis of Potential CXR COVID-19 Marker

In CXR image analysis, the following standard biomarkers may be investigated.

1) Lung morphology: As shown in FIG. 3B, the morphological structure of the segmented lung areas may be evaluated across several classes.
2) Average lung intensity: As shown in FIG. 3C, in the case of a segmented lung area, an average value of the pixel intensity within the lung area may be calculated.
3) Standard deviation of lung intensity: In the intensity histogram of the lung area pixel, the standard deviation indicated by arrow shown in FIG. 3C may be calculated.
4) Cardiothoracic ratio (CTR): The CTR may be calculated by dividing the maximum transverse heart diameter by the maximum inner chest diameter annotated by bidirectional arrows shown in FIG. 3A, respectively. The cardiothoracic ratio (CTR) is a widely used marker for diagnosing myocardial infarction. In COVID-19 CXR, when the chest boundary is blurred due to rounded opacities or consolidation, it is assumed that a distinct CTR value other than the average may be used as an anomaly.

Statistical analysis of potential biomarkers may be performed using MATLAB 2015a (Mathworks, Natick), and the Kolmogorov Smirnov test may be used to evaluate the normal distribution of marker candidates. For non-normally distributed variables, the Wilcoxon signature rank test may be used to compare the segmentation performance with the same data size, and the Wilcoxon rank sum test may be used to compare COVID-19 marker candidates with other classes with different data sizes.

Classification Performance Indicator

The performance of the classification method may be evaluated using a confusion matrix. True positive (TP), true negative (TN), false positive (FP) and false negative (FN) values can be obtained from the error matrix, and five indicators for performance evaluation can be calculated as follows.

$$\text{Accuracy} = (TN+TP)/(TN+TP+FN+FP) \quad 1)$$

$$\text{Precision} = TP/(TP+FP) \quad 2)$$

$$\text{Recall} = TP/(TP+FN) \quad 3)$$

$$F1 \text{ score} = 2(\text{Precision} \times \text{Recall})/(\text{Precision}+\text{Recall}) \quad 4)$$

$$\text{Distinctiveness} = TN/(TN+FP) \quad 5)$$

Among them, the F1 score may be used as an early stop evaluation index, and the entire index score of the algorithm may be calculated by averaging each index of several classes.

Figure 4:
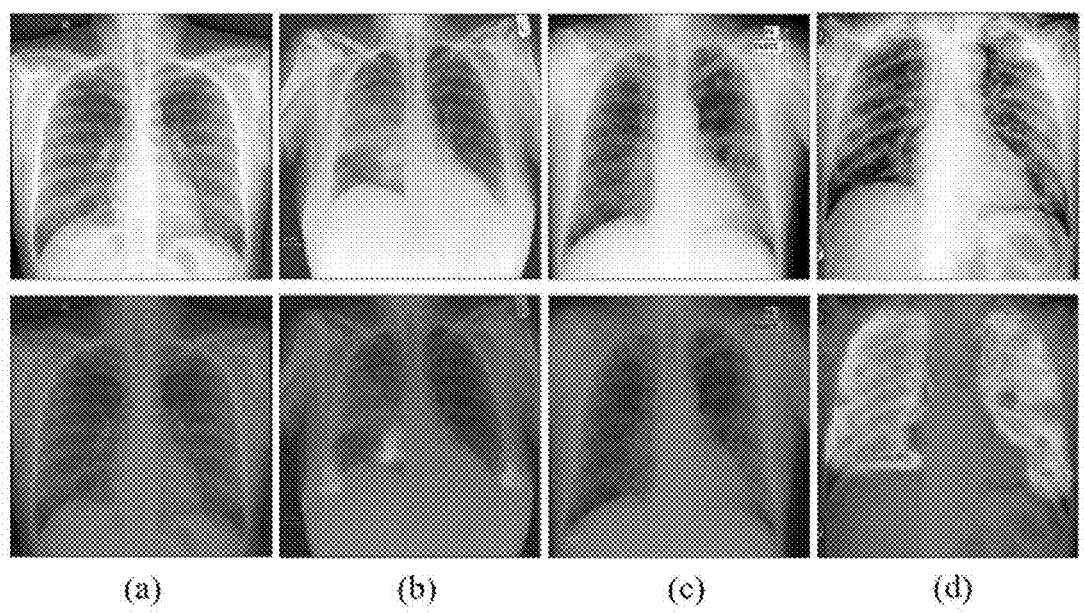
FIG. 4 is a view showing examples visualized using the method of the inventive concept.

FIG. 4 is a view showing examples visualized using the method of the inventive concept, where (a) is normal, (b) is bacteria, (c) is tuberculosis, and (d) is the probabilistic Grad-CAM of COVID-19 class for a COVID-19 pneumonia patient.

As shown in FIG. 4, it may be understood that, through the method of the inventive concept, a suspicious area hardly appears in other lesions, but in the case of COVID-19, a suspicious portion is clearly displayed in high definition.

As described above, a method according to an embodiment of the inventive concept may classify a lesion of a chest x-ray radiograph, for example, COVID-19, based on data normalization and a local patch.

In addition, a method according to the embodiment of the inventive concept may use a normalization scheme to uniformly normalize the heterogeneity that occurs between unrefined data, thereby overcoming the bias of learning. In addition, the method may obtain various patch images from one image in a local patch-based scheme to secure the diversity of images, so that it is possible to overcome the limitation of generalization occurring in a small data set. That is, the method of the inventive concept may secure stable lesion classification performance by using less data, and more effectively visualize lesions exhibiting multiple patterns such as lung disease through the feature maps to which probabilistic weights are applied.

Furthermore, a method according to another embodiment of the inventive concept may use an original chest x-ray radiograph rather than a normalized image according to a situation as an input of the segmentation network, thereby segmenting an organ area.

Figure 5:
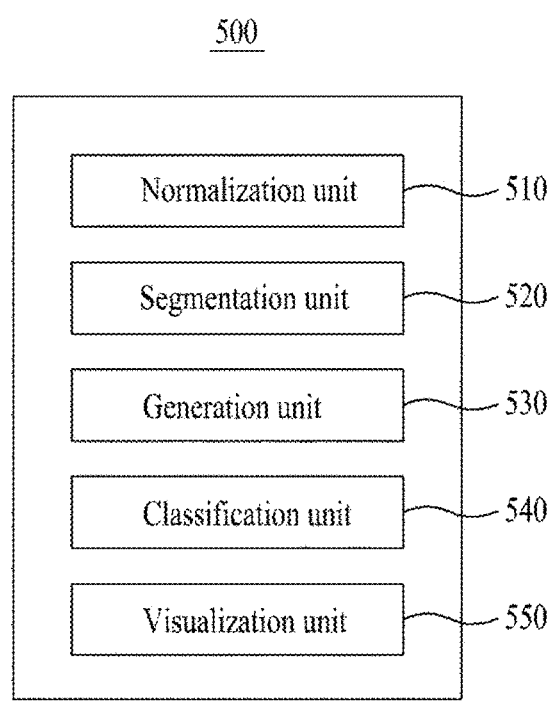
FIG. 5 is a block diagram illustrating a configuration of an apparatus for classifying a lesion of a chest x-ray radiograph according to an embodiment of the inventive concept.

FIG. 5 is a block diagram illustrating a configuration of an apparatus for classifying a lesion of a chest x-ray radiograph according to an embodiment of the inventive concept, and illustrates a conceptual configuration of an apparatus for performing the method of FIGS. 1 to 4.

Referring to FIG. 5, an apparatus 500 for classifying a lesion of a chest x-ray radiograph according to an embodiment of the inventive concept includes a normalization unit 510, a segmentation unit 520, a generation unit 530, a classification unit 540, and a visualization unit 550.

The normalization unit 510 converts the input chest x-ray radiograph into a normalized image.

In this case, the normalization unit 510 may convert the input chest x-ray radiograph into the normalized image by performing the gamma correction in the image area of the input chest x-ray radiograph. In addition, the normalization unit 510 may convert the input chest x-ray radiograph into the normalized image by using the characteristics of gamma correction and uniformly normalizing the heterogeneity between data while emphasizing the contrast between signal intensities of different organs.

The segmentation unit 520 segments the converted normalized image into the organ areas by using the first neural network based on a pre-learned segmentation model, for example, an organ segmentation neural network.

The generation unit 530 generates local patches for the segmented organ areas.

In this case, the generation unit 530 may generate the organ image for the segmented organ area by using the segmented organ area and the normalized image, and generate the local patches based on the lung area of the generated organ image.

The classification unit 540 may classify lesions from the input chest x-ray radiograph by using the second neural network based on the pre-learned classification model, for example, a lesion classification neural network with respect to the generated local patches.

In this case, the classification unit 540 may classify the most classified lesion among the lesion classification results for each of the generated local patches as the final lesion.

The visualization unit 550 may obtain the probabilistic weight from each of the local patches corresponding to the classified lesion and then apply the probabilistic weight to the Saliency map, thereby visualizing the lesion.

In this case, the visualization unit 550 may visualize the classified lesion by using a gradient weighted class activation map.

Further, in operation S120 of FIG. 1, an organ area may be segmented from a chest x-ray radiograph by using a first neural network based on a segmentation model learned in advance with adaptive instance normalization. This will be described in detail as follows.

In this case, in the process of segmenting the organ area in the chest x-ray radiograph by using the first neural network, the organ area may be segmented in the lung of the chest x-ray radiograph by using the first neural network and the pre-built adaptive instance normalization code.

In this case, in the process of segmenting the organ area in the chest x-ray radiograph by using the first neural network, by changing each adaptive instance normalization code for the encoder and decoder of the first neural network, the organ area may be segmented from the normal lung based on supervised learning, the organ area may be segmented from the abnormal lung based on the domain adaptation scheme, and the organ area may be segmented from each of the normal lung and the abnormal lung based on the self-supervised learning scheme in which knowledge is distilled through the supervised learning and the domain adaptation.

In this case, the first neural network may learn the first adaptive instance regularization code that converts the abnormal lung to the normal lung through the domain adaptation scheme after learning lung area segmentation based on the supervised learning technique in the normal lung, and may learn in the self-supervised learning scheme by distilling the knowledge learned through the supervised learning and domain adaptation scheme to the second adaptive instance regularization code, such that the organ areas may be segmented from the normal and abnormal lungs by integrating domain adaptation and segmentation.

In this case, in the process of segmenting the organ area in the chest x-ray radiograph by using the first neural network, the organ area may be segmented from the normal lung in which organ labels in units of image pixels exist, based on the supervised learning scheme using the first neural network.

In this case, in the process of segmenting the organ area from the chest x-ray radiograph by using the first neural network, the abnormal lung may domain-converted into the normal lung domain by using the adaptive instance normalization scheme using the first neural network, such that the organ areas may be segmented from the abnormal lung domain-converted into the normal lung.

In this case, in the process of segmenting the organ area in the chest x-ray radiograph by using the first neural network, the organ areas may be segmented from each of the abnormal lung domain-converted into the normal lung and the labeled normal lung based on the self-supervised learning using the first neural network.

The process of segmenting an organ area from a chest x-ray radiograph by using the first neural network will be described in detail with reference to FIGS. 6 to 9 as follows.

StarGANv2 (Choi, Y., Uh, Y., Yoo, J., Ha, J. W., 2020. Stargan v2: Diverse image synthesis for multiple domains, in: Proceedings of the IEEE/CVF Conference on Computer Vision and Pattern Recognition, pp. 8188-8197.) One of the unique characteristics of an image transformation approach scheme is that all training data sets may be fully used through the common feature across several domains through a shared network layer, but it is still possible to adapt domain-specific adaptations using different AdaIN codes. The first neural network may integrate domain adaptation and segmentation through AdaIN-based knowledge distillation.

Figure 6:
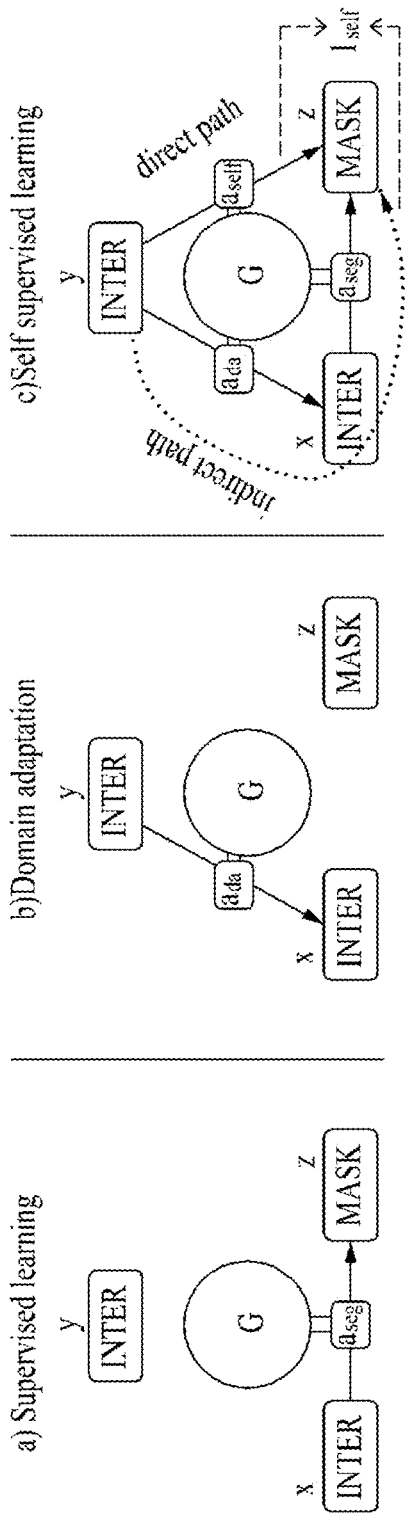
FIG. 6 is a view illustrating an integrated domain adaptation and segment framework for segmenting an organ area.

In detail, in the a process of segmenting an organ area from a chest x-ray radiograph by using the first neural network, the training data are classified into three groups of a segmentation mask (MASK), a matched input image domain (INTRA), and a domain shift input image (INTER) in which that a segmentation label is not designated. In more detail, as shown in FIG. 6, the training data in the INTRA domain matches a segmentation mask in the MASK domain, whereas a large number of training data sets in the INTER domain do not have a segmentation mask.

Due to the domain shift between the INTRA domain and the INTER domain, a network trained in a supervised scheme using INTRA data does not generalize well for INTER domain images. To alleviate this problem, as shown in FIG. 6A, a single generator trained with adaptive instance normalization (AdaIN) may perform map segmentation by using INTRA data for a specific AdaIN code, and as shown in FIG. 6B, may perform domain adaptation between the INTER domain and the INTRA domain by using different AdaIN codes. Then, as shown in FIG. 6C, because the network is trained in a self-supervised scheme that forces the direct segmentation results to match other segmentation results through segmentation after domain adaptation, the direct segmentation using INTER images may be performed by using another AadIN code. Thus, knowledge may be distilled between different tasks.

When the first neural network is trained, only a single generator and a pre-built AdaIN code may be used in the inference operation for INTRA and INTER domain image segmentation.

Figure 7:
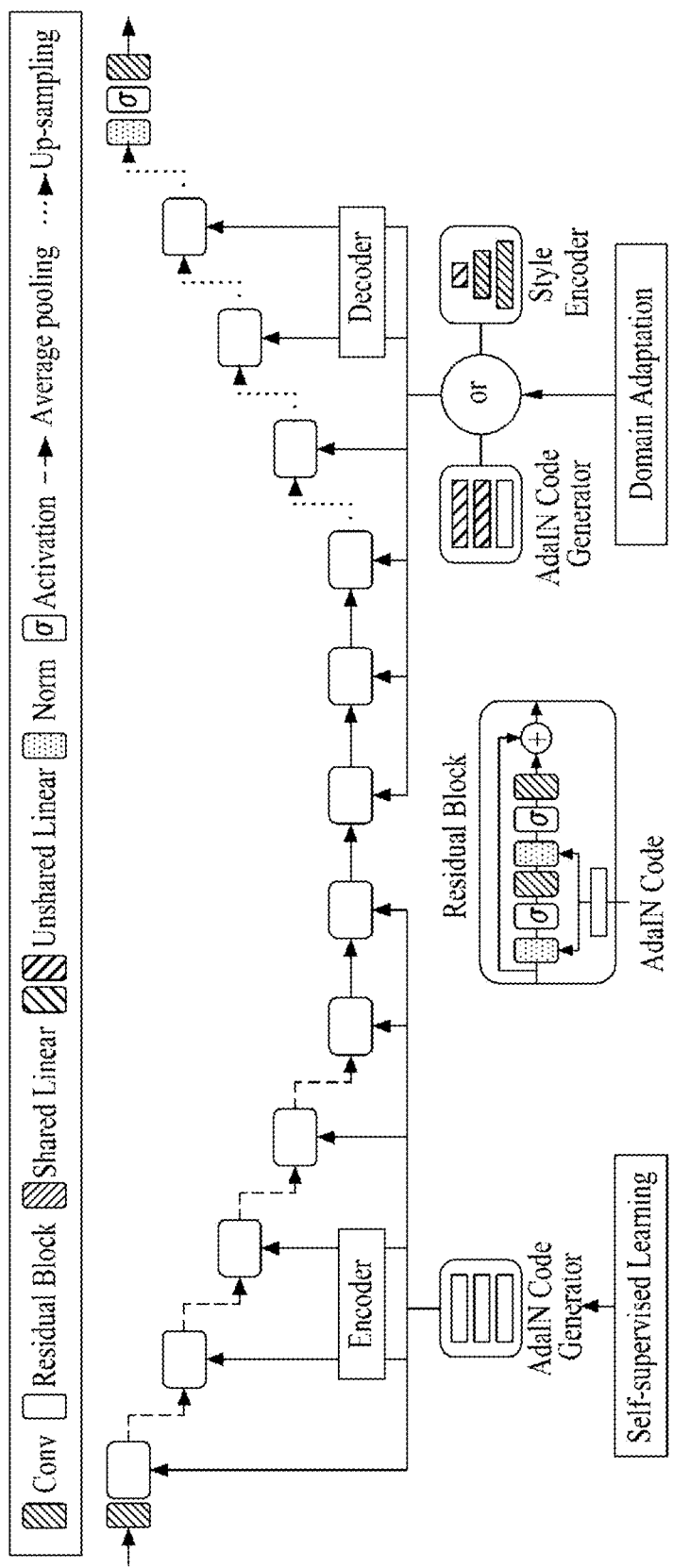
FIG. 7 is a view illustrating an architecture of a neural network for segmenting an organ area.
Figure 8:
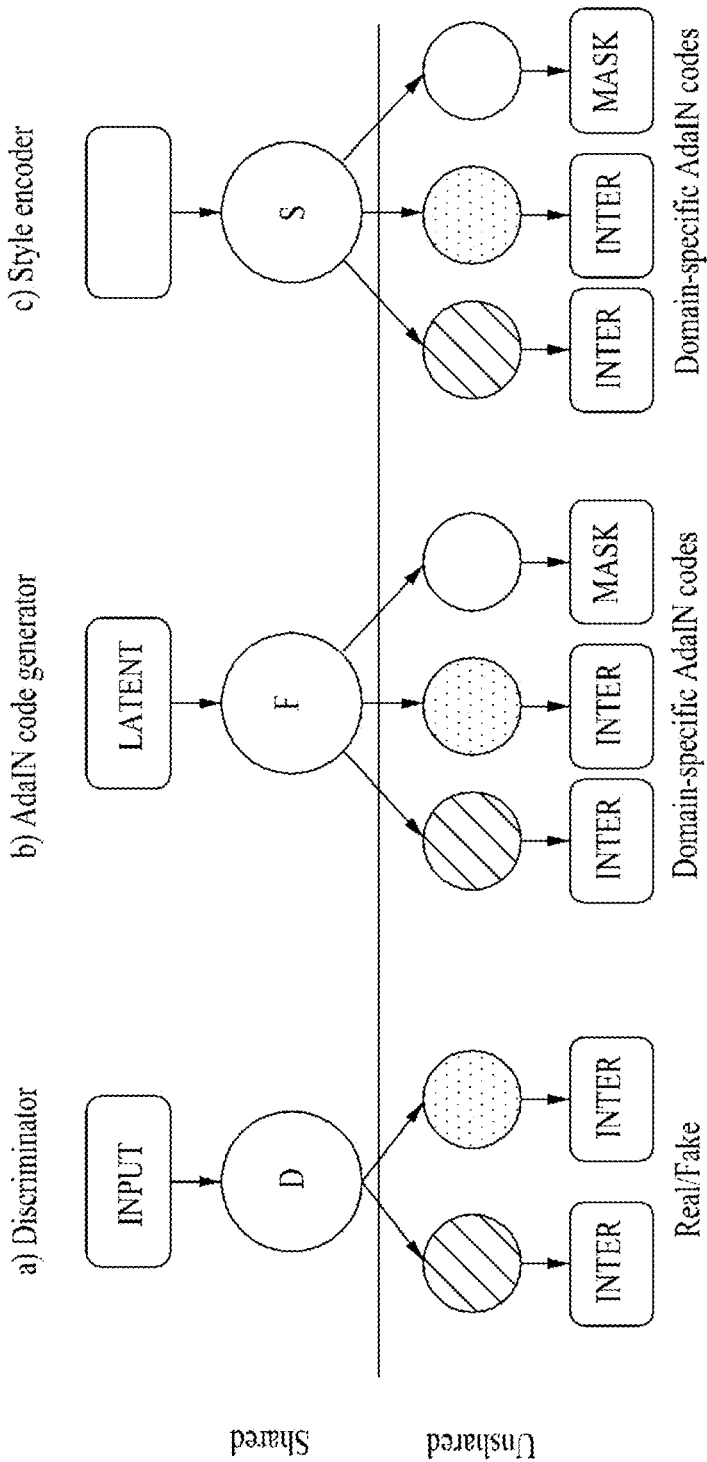
FIG. 8 is a view illustrating architectures of a multi-head discriminator, an AdaIN code generator and a style encoder.

As shown in FIG. 7, the overall architecture of the first neural network may include a single generator G, a style encoder S, AdaIN code generators $F_e$ and $F_d$ of each encoder and decoder, and a multi-head discriminator D. The single generator may be connected with two AdaIN code generators and one style encoder, and be divided into an encoder and a decoder including a series of residual blocks. The output code generated from the AdaIN code generators or style encoder may be coupled to the AdaIN layer of each residual block. One of the reasons for introducing the style encoder S is to impose additional constraints on AdaIN code generation so that the AdaIN code generator may be normalized to generate a meaningful code. In this case, the style encoder, the AdaIN code generator and the discriminator may have a multi-head structure.

One of the main differences between the first neural network and the StarGANv2 is an encoder-decoder architecture with an independent AdaIN code layer for an encoder and a decoder. Because of the two separate AdaIN codes for the encoder and the decoder, the generator according to the inventive concept only needs to change the AdaIN code combination of the two AdaIN code generators, as shown in Table 1 below, to perform map segmentation, domain adaptation and self-supervised learning.

In particular, when 'X', 'Y' and 'Z' refer to INTRA, INTER and MASK domains related to probability distributions $P_X$, $P_Y$ and $P_Z$, the generator may be defined as in following equation 6.

$$v = G(u,a), a := (F_e, F_d) \qquad \text{[Equation 6]}$$

Where u may mean an input image of 'X' or 'Y', and $a \in \{a_{seg}, a'_{seg}, a^x_{da}, a^Y_{da}, a_{self}\}$ may mean the AdaIN code shown in Table 1. Depending on the input data and the AdaIN code, the network output 'v' may be one of 'X', 'Y' or 'Z'.

The training loss is extended from the training loss of StarGANv2, and may include a segmentation task and self-supervised learning.

Map Segmentation

FIG. 6A is a view illustrating a map segmentation that may be considered as a transformation from INTRA to MASK domain, where the generator may learn as following Equation 7.

$$\min_{G,S} \lambda_{seg} \ell_{seg}(G) + \lambda_{style} \ell_{style}(G, S) \qquad \text{[Equation 7]}$$

In this case, λseg and λstyle mean hyperparameters, the division loss lseg is defined by the cross-entropy loss between the generated output and the matching label, and the division loss lseg is below <Equation 8> can be expressed as following Equation 8.

$$l_{seg}(G) = -\mathbb{E}[z_i \log \hat{p}_i(G(x, a_{seg}))] \qquad \text{[Equation 8]}$$

Where $z_i$ means the i-th pixel of the ground truth segmentation mask $z \in Z$ with respect to the input image $x \in X$, and $\hat{p}_i(G)$ may mean a softmax probability function of the i-th pixel in the fake image generated by $G(x, a_{seg})$.

When a segmentation result for a given AdaIN style code is generated, the style encoder having the segmentation result as an input is forced to match the dummy AdaIN code $a'_{seg}$ generated by the style encoder of the MASK domain. This may be achieved by using the style loss of following Equation 9.

$$l_{style}(G,S) = \mathbb{E}_{x \sim P_x}[\|a'_{seg} - S(G(x, a_{seg}))\|_1] \qquad \text{[Equation 9]}$$

Where $a'_{seg}$ may mean an AdaIN code for each MASK domain. Although this code is not directly used for segmentation, generating the AdaIN code in a style code generator

TABLE 1

| AdaIN codes | Task | $F_e$ (mean, std) | $F_d$ (mean, std) | Training type |
|---|---|---|---|---|
| $a_{seg}$ | [INTRA] → [MASK] | (0, 1) | (0, 1) | segmentation |
| $a'_{seg}$ | [INTRA] → [MASK] | (0, 1) | learnable | dummy segmentation code |
| $a^x_{da}$ | [INTER] → [INTRA] | (0, 1) | learnable | domain adaptation |
| $a^Y_{da}$ | [INTRA] → [INTER] | (0, 1) | learnable | domain adaptation |
| $a_{self}$ | [INTER] → [MASK] | learnable | (0, 1) | self-supervised |

For example, in the case of a segmentation operation, the constant AdaIN code (0, 1) is used in both the encoder and the decoder, leading to standard instance normalization. Meanwhile, the learnable AdaIN code is used in the decoder AdaIN layer in the transformation to the INTRA and INTER domains. However, another learnable AdaIN code may be used in the encoder AdaIN layer for self-supervised learning tasks to perform consistent reconstructions across different paths.

may be important for training the shared layer in the multi-head structure of the AdaIN code generator and style encoder.

Domain Adaptation

Domain adaptive training is basically similar to Star-GANv2. FIG. 6B is a view illustrating a domain adaptive training scheme between 'X' and 'Y'. According to the inventive concept, the first neural network may be trained by solving the optimization problem expressed as following Equation 10.

$$\min_{G,S,F_e,F_d} \max_D \ell_{da}(G, F_e, F_d, S, D) \quad \text{[Equation 10]}$$

Where the domain adaptation loss $l_{da}$ may be expressed as the following equation.

$$\ell_{da}(G, F_e, F_d, S, D) =$$
$$\ell_{adv}(G, D, F_d, S) + \lambda_{cycle}\ell_{cycle}(G, S) + \lambda_{style}\ell_{style}(G, S) - \lambda_{div}\ell_{div}(G, F_d, S)$$

Where $\lambda_{cycle}$, $\lambda_{style}$ and $\lambda_{div}$ may denote hyper parameters, $l_{adv}$ may denote a hostile loss, and the hostile loss may be expressed as following Equation 11.

$$l_{adv}(G,D,F_d,S) = \mathbb{E}_{s \sim P_s}[\log D_s(s)] + \mathbb{E}_{s \sim P_s}[\log(1 - D_t(G(s, a_{da}^\tau)))] \quad \text{[Equation 11]}$$

Where domains S and T mean source and target domains, and because they are randomly selected from 'X' and 'Y' as shown in FIG. 8A, Equation 11 may consider all combinations of a source domain and other domains to allow another header of the discriminator to be optimized in each X or Y domain. In addition, the learnable part of the AdaIN code $a^\tau_{da}$ is generated in the encoder AdaIN code generator $F_d$ or the style encoder $S(x)$ to which the reference target $t \in T$ is given as shown in FIGS. 8B and 8C, so that the header may be optimized. This technique may follow the procedure used in StarGANv2 as it is.

Furthermore, according to the inventive concept, a cycle coherence loss $l_{cycle}$ expressed as following Equation 12 may be defined by using a similar random selection of the source domain and the target domain.

$$\ell_{cycle}(G, S) = \mathbb{E}_{s \sim p_S}[\|x - G(G(s, a_{da}^\tau), a_{da}^S)\|_1] \quad \text{[Equation 12]}$$

Similar to the cycle coherence loss $l_{cycle}$ in an image, the style loss $l_{style}$ of Equation 9 may be introduced to enhance cycle coherence in the AdaIN code domain. In more detail, when a fake image is generated using the domain-specific AdaIN code, the style encoder using the fake image as an input must reproduce the original AdaIN code. This may be achieved by using a style loss expressed as following Equation 13. $A = \pi r^2$ $$\ell_{style}(G, S) = \mathbb{E}_{s \sim p_S}[\|a_{da}^\tau - S(G(s, a_{da}^\tau))\|_1] \quad \text{[Equation 13]}$$

Finally, in order to diversify the generated fake images, it is necessary to maximize the difference between the two fake images generated with two different AdaIN codes. This can be achieved by maximizing the loss as in Equation 14 below.

$$\ell_{div}(G, F_d, S) = \mathbb{E}_{s \sim p_S}[\|G(s, a_{da}^\tau) - G(s, a_{da}'^\tau)\|_1] \quad \text{[Equation 14]}$$

Where $a^\tau_{da}$ and $a'\tau_{da}$ may be randomly generated from an AdaIN code generator or may be generated from a style encoder S to which two different images are given.

Self-Supervised Learning

The goal of self-supervised learning is that an image in the INTER domain may directly generate a segmentation result as illustrated by the red arrow in FIG. 6C.

In particular, because the INTER domain does not have a segmentation mask, the knowledge learned in supervised learning and domain adaptation must be distilled. Accordingly, the contribution of the inventive concept comes from introducing a new constraint. The segmentation output trained in the self-supervised scheme matches another segmentation output generated through domain adaptation described by the green and black arrows in FIG. 6C, respectively. In addition, in the inference stage, it is often difficult to know which domain the input came from. Therefore, one AdaIN code must process both INTRA and INTER domain image segmentations. This results in a self-coherence loss expressed as following Equation 15.

$$\ell_{self}(G, F_e) = \lambda_{inter}\ell_{inter}(G, F_e) + \lambda_{intra}\ell_{intra}(G, F_e) = \quad \text{[Equation 15]}$$
$$\mathbb{E}_{y \sim p_Y}[\|G(G(y, a_{da}^T), a_{seg}) - G(y, a_{self})\|_1] +$$
$$\mathbb{E}_{x \sim P_X}[\|G(x, a_{self}) - G(x, a_{seg})\|_1]$$

Where $l_{inter}$ and $l_{intra}$ may mean intra-domain autocorrelation loss and intra-domain autocorrelation loss, respectively, and $\lambda_{inter}$ and $\lambda_{intra}$ may mean hyper parameters for intra-domain and intra-domain, respectively.

In fact, this procedure may be considered a teacher-student approach. The indirect path of FIG. 6C is a teacher network that guides the training procedure of the student network in the direct path of FIG. 6C. However, in contrast to the existing teacher-student approach, the approach of the inventive concept does not require separate networks for teachers and students. Instead, the same generators with different AdaIN combinations serve as teachers or students, which is another great advantage in the method according to the inventive concept.

In order to train a single generator framework for self-supervised learning tasks without sacrificing supervised segmentation performance, an AdaIN code generator $F_e$ may be introduced into the encoder while the decoder still uses code a fixed AdaIN (1, 0) corresponding to standard instance normalization as described in Table 1 above.

Network Architecture

As shown in FIG. 7, the generator G for segmenting an image may include an encoder module and a decoder module. In particular, the encoder part includes 4 down-sampling residual blocks and 2 intermediate residual blocks, and the decoder part includes 2 intermediate residual blocks and 4 up-sampling residual blocks. Each residual block includes an AdaIN layer, an activation layer, and a convolution layer. All AdaIN layers are connected to the AdaIN code generator, and in the case of the decoder module, the style encoder is also connected for domain adaptation tasks.

Similar to StarGANv2, the discriminator D includes a multi-head non-shared convolutional layer for each image domain, that is, INTER, INTRA, as shown in FIG. 8A. In the discriminator, the input image may be individually classified as '1' or '0' for each domain, where '1' may mean a real image and '0' may mean a fake image. The AdaIN code generator includes a multi-head non-shared linear layer for each domain, which a shared linear layer follows, as shown in FIG. 8B. Therefore, the AdaIN code for each domain may be generated through a shared layer, and then may be generated through a non-shared layer for each domain. In addition, the style encoder includes a multi-head non-shared linear layer for each domain which a shared convolutional layer follows, as shown in FIG. 8C. In the style encoder, the input image may be decoded into an AdaIN code for each domain for each domain through the shared layer and the non-shared layer.

Due to the existence of the shared layer, it is possible to distill the knowledge of specific domain translation into another domain to improve the overall performance of the discriminator.

Data Set

The public CXR data set may be utilized to evaluate the performance of the domain adaptation and segmentation task according to the inventive concept. In the case of the map segmentation task, general CXR images of a JSRT data set with paired lung annotations in the SCR data set may be used as INTRA and MASK domains, respectively. For abnormal CXR images, that is, for the INTER domain, pneumonia CXR data sets may be collected from four sources of RSNA COVID19 data sets, Cohen pneumonia data sets, BRIXIA COVID-19 data sets, and BIMCV data sets, the characteristics of each of which are shown in Table 2.

iteratively to train the domain adaptation and map segmentation task at the same time, and may adopt an early stopping strategy based on the validation test performance of the map segmentation task. After training until the segmentation and domain adaptation tasks guarantee a certain performance, the network may continue to be trained in a self-supervised scheme for an additional 5K iteration, and when the training iteration reaches a certain fixed iteration point in the full iteration, the learning rate may be reduced by a factor of 10.

For domain adaptation task, MUNIT and the original StarGANv2 may be used as reference models for comparative studies, and the model may be trained with INTRA and INTER domain images having the same experimental settings as those of the model of the inventive concept. In the case of the segmentation task, the inventive concept may use U-Net as a reference and may be trained with the same experimental settings as the segmentation task. The XLSor may be added as an additional reference to compare the synergistic effects of domain adaptation and segmentation tasks. The XLSor may be tested by utilizing pre-trained weights, where the weight may be trained in a semi-supervised scheme by using a pseudo-labeled pneumonia data set generated on a large-scale through MUNIT.

In the inference operation, as a post-processing operation of the segmentation task, the two largest contours may be automatically selected based on the contour area, all holes

TABLE 2

|  | Dataset | Nation | Disease class | bit | View | Total | Training | Val | Test internal | Test external |
|---|---|---|---|---|---|---|---|---|---|---|
| Supervised train set | JSRT/SCR | Japan | Normal, Nodule | 12 | PA | 247 | 178 | 20 | 49 | — |
| Unsupervised train set | RSNA | USA | Pneumonia (COVID-19) | 10 | AP | 218 | 218 | — | — | — |
|  | Cohen et al. | — | Pneumonia (COVID-19), Virus, Bacteria, Tuberculosis) | 8 | PA, AP | 680 | 640 | — | 40 | — |
| Test dataset | BRIXIA | Italy | Pneumonia (COVID-19) | 16 | AP | 2384 | — | — | — | 2384 |
|  | BIMCV | Spain | Pneumonia (COVID-19) | 16 | AP | 374 | — | — | — | 374 |

Implementation Details

The first neural network may be trained by supplying input images from two randomly selected pairs of domains, where one is for the source domain and the other is for the target domain. For example, when a domain pair including an INTER domain and an INTRA domain is supplied to a network, the network is trained for a domain adaptation task. When a domain pair including INTRA as a source and MASK as a target domain is supplied to the network, the network is trained for the map segmentation task. In the case of self-supervised learning, an image may be supplied from INTRA to MASK domain as an original domain for outputting not only the MASK domain in INTRA but also the segmentation mask of the MASK domain. In terms of the training sequence, self-supervised training starts after the map segmentation and domain adaptation tasks are performed.

This method may be implemented as a PyTorch library, the model may be trained by applying an Adam optimizer, and the batch size may be set to '1'. This model may be trained by using NVIDIA GeForce GTX 1080Ti GPU, hyper parameters may be selected as λcycle=2, λstyle=1, λ div=1, λseg=5, λinter=10, λintra=1, and the learning rate can be optimized to 0.0001.

The size of all input CXR images and labels may be adjusted to 256×256, and no pre-processing or data expansion may be performed except for normalizing the pixel intensity to [−1.0,1.0]. The network may train 20K times within each contour may be filled, and the same post-processing operation for all methods may be applied for fair comparison.

In the case of the CXR data set, the segmentation performance associated with new normal CXR data with a ground validation segmentation mask may be quantified by using the Dice similarity score indices of both lung contours. Meanwhile, due to the lack of ground validation (or survey) labels, the domain adaptation and self-supervised segmentation performance of the INTER domain may be evaluated based on the generation of predicted lung structures covered with highly hardened areas. The rectangular box that completely covers each lung structure may be drawn manually on the CXR image, and then the fitness to the generated fake image and segmentation result may be qualitatively evaluated.

Figure 9:
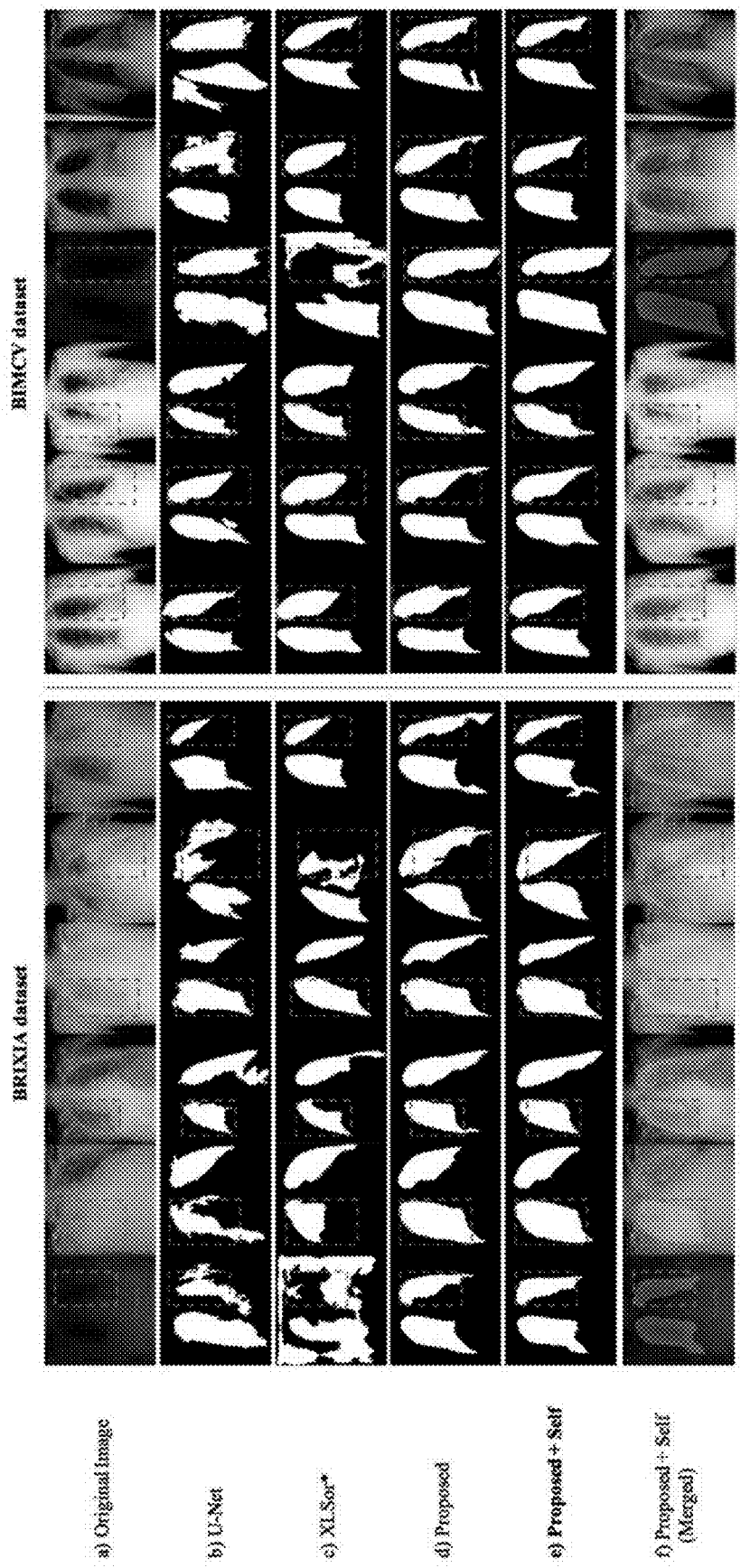
FIG. 9 is a view illustrating an example of comparing the organ segmentation results for an abnormal lung in a chest x-ray radiograph.

FIG. 9 is a view illustrating an example of comparing the unsupervised segmentation results using an external test data set, where the external test data set including two COVID-19 pneumonia databases shows various intensity distributions as shown in FIG. 9A. In addition as shown in FIG. 9B, it may be understood that the U-Net failed to segment the normal lung shape from most pneumonic lungs, and it may be understood that the intensity distribution of the source domain is shown. In addition, as shown in FIG. 9C, the XLSor shows excellent segmentation performance (4-th and 12-th columns) in mild opaque pneumonia cases, but in the severe cases of pneumonia, it may be understood that the XLSor does not segment the lung area or is generalized (1st, 5-th and 10-th columns) for domain-shifted inputs. The method according to the inventive concept shows the best partitioning performance on new data sets. It may be understood that the method according to the inventive concept shown in FIGS. 9D and 9E may successfully segment the lung structure in the domain shift input without under-segmentation or severe over-segmentation. Moreover, it may be understood that the segmentation results generated by the model of the inventive concept trained with loss of self-coherence have a better fitness in the predicted lung area compared to the method of the inventive concept without self-supervised learning. That is, as understood through FIG. 9, it may be understood that the qualitative performance of the model of the inventive concept for organ segmentation in abnormal lung images is significantly superior to other segmentation algorithms.

Table 3 below shows the segmentation performance of the general CXR data set, and shows comparisons of supervised segmentation performances for the general CXR images using the first neural network and another network. As understood through the Dice index of the lung segmentation result in Table 3, compared with U-Net and XLSor with a Dice index of 0.976, which is the SOTA performance of the current deep learning-based normal lung segmentation, it may be understood that the segmentation method of the inventive concept provides excellent performance for abnormal CXR and exhibits a similar Dice index. That is, it may be confirmed that the segmentation method of the inventive concept derives performance comparable to the performance of the model currently evaluated as the best in the industry.

TABLE 3

| Method | Normal CXR Dice index | Abnormal CXR Qualitative evaluation |
| --- | --- | --- |
| U-Net | 0.976 ± 0.012 | FIG. 9b |
| XLSor* | 0.976 ± 0.010 | FIG. 9c |
| Proposed | 0.966 ± 0.013 | FIG. 9d |
| Proposed + Self | 0.959 ± 0.014 | FIG. 9e |

The asterisk * indicates performance reported.

As described above, the chest x-ray radiograph segmentation method using the first neural network may utilize one neural network based on adaptive instance normalization in the chest x-ray radiograph to segment organ areas from an abnormal lung and a normal lung.

Because the generation of organ area labels in units of image pixels is costly and time-consuming, and especially there is a lack of labels for abnormal lungs, the chest x-ray radiograph segmentation method using the first neural network may learn lung area segmentation based on a supervised learning scheme in a normal lung in one integrated algorithm, may learn a first adaptive instance normalization code that transforms an abnormal lung into a normal lung through a domain adaptation scheme, and then, may distill the knowledge learned through supervised learning and domain adaptation into another second adaptive instance regularization code, thereby segmenting normal and abnormal lungs through the self-supervised learning scheme with good performance.

Furthermore, a method according to another embodiment of the inventive concept may utilize a vision transformer to quantify the severity of a classified lesion. A technique for quantifying the severity of a classified lesion using a vision transformer will be described as follows.

Many studies have applied CXR deep learning for diagnosis or quantification of the severity of COVID-19, but they suffer from low generalization performance. Stable generalization performance for new data is essential for the wide utilization of a system.

One of the most commonly used methods to solve the above problem is to learn a model with a large number of data, but it is difficult to construct large data sets of COVID-19 in the current pandemic situation. As a result, a method for mitigating the problem using weakly-supervised learning and anomaly detection has been proposed, but the generalization performance is still insufficient.

Previous studies mainly utilize a convolutional neural network (CNN) model, which may not be suitable for infectious diseases such as COVID-19, which are predominantly GGO and consolidation-like lesions on both sides and bottom. Although the CNN structure has been shown to be excellent in many kinds of visual tasks, the proximity-based convolution operation may not be optimal for problems requiring CXR disease classification that considers the location of the lesion and the intensity at that location.

To overcome the limitations of CNN in modeling the positional relationship between pixels, the vision transformer was proposed to model the long-distance dependence between pixels, and showed the best (SOTA) performance in the image classification problem.

Meaningful embedding is a prerequisite for high performance of vision transformers. In the original paper, when the number of data sets is small, the vision transformer uses the embedded feature map by passing the image through CNN such as ResNet. However, the problem is that ResNet's embedding may not be the optimal input embedding for CXR diagnosis of COVID-19. Fortunately, several large CXR data sets were made public before the COVID-19 pandemic. For example, CheXpert, which is large data sets including more than 220,000 CXR images, provides, as labels, low-level CXR findings (e.g., integration, opacity, edema, and the like), which are also useful information for diagnosing infectious diseases. In addition, an excellent CNN architecture using such data sets has been proposed, which uses probabilistic class activation map (PCAM) pooling to improve classification performance.

The lesion or infectious disease severity quantification technique according to another embodiment of the inventive concept provides a new vision transformer (ViT) architecture that utilizes the CNN architecture as a low-level CXR feature map extractor, where the vision transformer receives the feature map to diagnose disease.

Another important contribution of the lesion or infectious disease severity quantification technology according to another embodiment of the inventive concept is that the vision transformer framework performs COVID-19 severity quantification and zoning of the lesion to continuously track the severity, thereby helping doctors make treatment decisions. Recently, a simple array-based labeling technique has been proposed that divides the lung into six areas for the severity of COVID-19 and assigns '1' or '0' to each of the six areas depending on the presence or absence of lesions. The inventive concept may utilize this method of labeling to predict and quantify severity between 0 and 6.

A method of quantifying the severity of a lesion or infectious disease according to still another embodiment of the inventive concept includes receiving an input chest x-ray radiograph, extracting a feature map from the received input chest x-ray radiograph by using a pre-learned neural network, classifying a lesion from the input chest x-ray radiograph by using a vision transformer based on the extracted feature map, and quantifying severity of the lesion based on the extracted feature map and the classified lesion.

In this case, the extracting of the feature map may include, after converting the received input chest x-ray radiograph into a normalized image, extracting the feature map from the normalized image by using the neural network.

In this case, the extracting of the feature map may convert the input chest x-ray radiograph into the normalized image by normalizing the width, height, and pixel value ranges of the image of the input chest x-ray radiograph to predetermined ranges.

In this case, the quantifying may include regionalizing the lesion based on the extracted feature map and the classified lesion.

In this case, the extracting of the feature map may include extracting the feature map containing low-level features of pneumonia, consolidation, lung opacity, pleural outflow, cardiac hypertrophy, edema, atelectasis, pneumothorax, auxiliary devices and no findings, for the input chest x-ray radiograph.

In this case, the classifying of the lesion may include classifying the lesion by combining the information included in the feature map, and classifying the most classified lesion among the classified lesion classification results as the final lesion.

In this case, the quantifying may include quantifying the severity of the lesion based on a combination of information included in the extracted feature map and the classified lesion and regionalizing the location of the lesion.

In this case, the quantifying may include generating a lesion probability map based on the extracted feature map and the classified lesion, and quantifying the severity of the lesion by using the generated lesion probability map.

In this case, the quantifying may include segmenting each of the lung areas of the input chest x-ray radiograph into three areas, assigning the maximum lesion probability value to each of the segmented areas, and quantifying the severity of the lesion for each of the segmented areas by using the assigned maximum lesion probability value.

In this case, the neural network may be pre-trained by the first large-scale training data set labeled, and then through training using the small-scale second training data set labeled for the lesion to be classified, may be weak-supervised trained together with the vision transformer.

One of the novel contributions in the inventive concept is to show that the generalization performance of a vision transformer model can be maximized using a low-level CXR corpus provided by a backbone network trained with large public data sets to generate CXR results.

Figure 10:
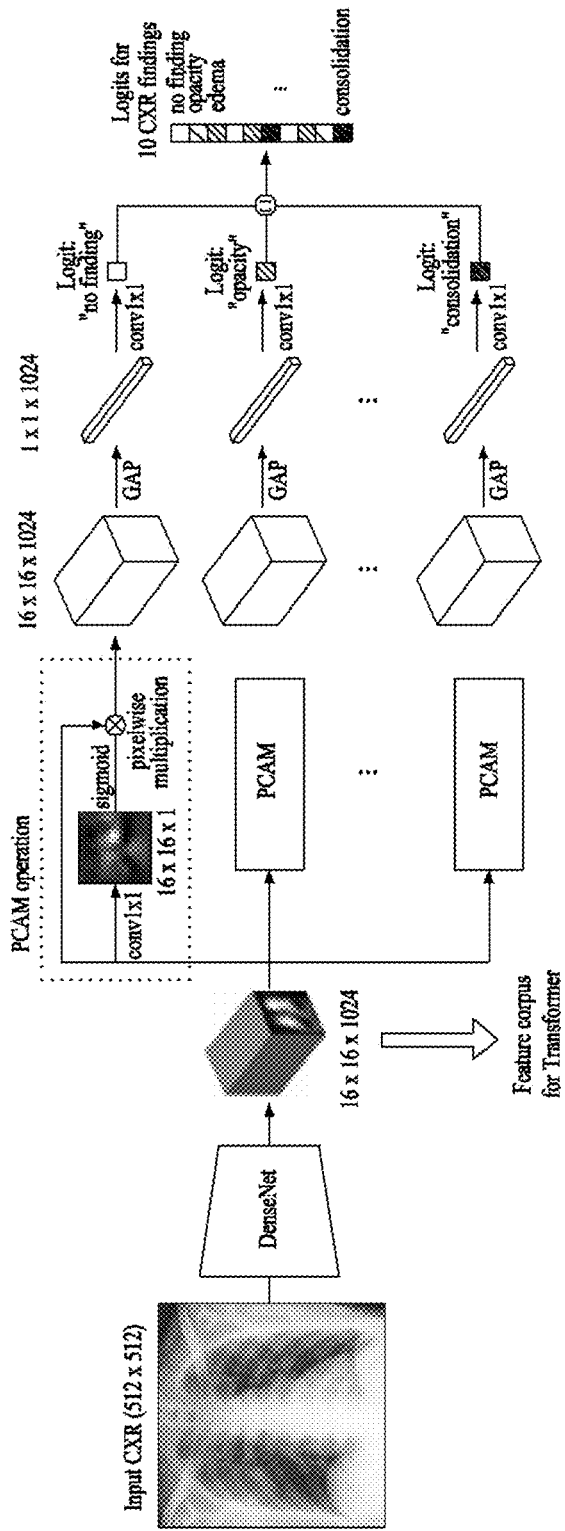
FIG. 10 is a view illustrating the structure and learning scheme of a feature map extractor according to the inventive concept.

FIG. 10 is a view illustrating the structure and learning scheme of a feature map extractor according to the inventive concept. As shown in FIG. 10, the backbone network for extracting the low-level CXR feature corpus from the image may utilize probabilistic class activation map (PCAM) pooling on the output of the DenseNet-121 based feature extractor to explicitly take advantage of the class activation map to improve both classification and positioning capabilities. The backbone network may be pre-trained on a large-scale public CXR imaging data set that classifies 10 radiological findings of pneumonia, consolidation, lung opacity, pleural effusion, cardiac hypertrophy, edema, atelectasis, pneumothorax, assistive devices, and non-findings. In detail, the inventive concept may use the 16×16×1024 feature before the transition layer 3 of DenseNet-121. The backbone network has several layers from which feature embedding can be extracted, where the most useful information is included in intermediate-level embeddings before PCAM operations.

However, because a PCAM device trained with certain low-level CXR features such as cardiac hypertrophy, lung opacity, edema, consolidation, and the like was essential to improve the accuracy of mid-level feature embedding by guiding aligned features to provide an optimal PCAM map, it is required to be careful. The feature maps of each layer of the backbone network may be used as embedded inputs of the vision transformer. In this case, experimentally, embedding before PCAM work may be composed of the most useful information.

Figure 11:
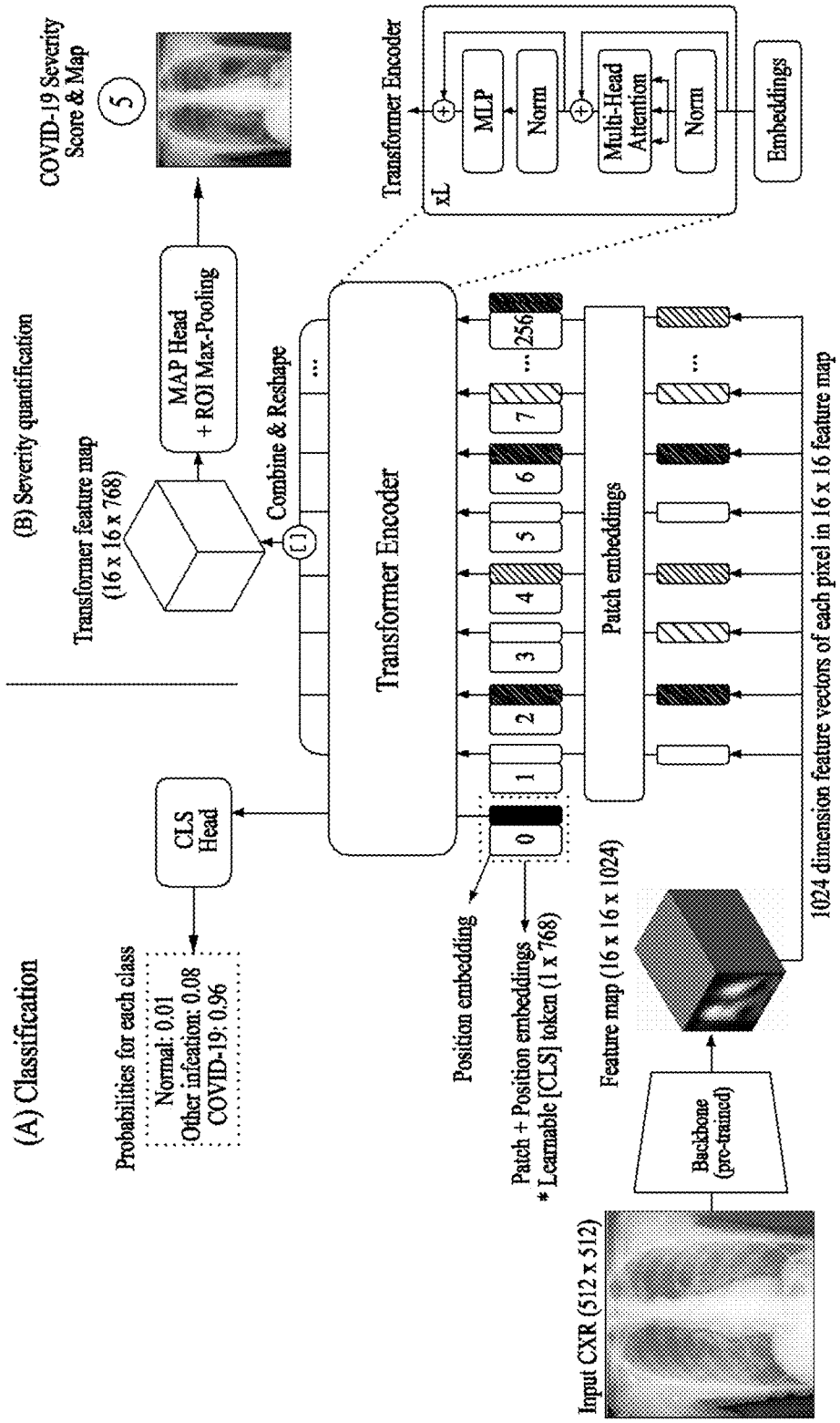
FIG. 11 is a view illustrating the structure of a vision transformer for performing lesion classification and severity quantification of a chest x-ray radiograph according to the inventive concept.

The overall structure of disease classification and severity quantification using the vision transformer is shown in FIG. 11. In detail, $\mathcal{G}$ receives a CXR image $x \in \mathbb{R}^{H \times W}$ having a size of H×W as an input, and extracts feature map F having a size of H'×W'.

$$F = \mathcal{G}(x)$$

The feature map $F \in \mathbb{R}^{H' \times W' \times C'}$ may be defined as follows.

$$F = [f_1, f_2, \ldots, f_{H' \times W'}]$$

Where $f_n \in \mathbb{R}^{C'}$ means a C-dimensional embedding feature vector at the n-th position of the feature map, contains a low-level CXR feature, and may be used as an input of the vision transformer.

Then, in a manner similar to a bidirectional encoder representation from transformer (BERT) model of the vision transformer, the vision transformer according to the inventive concept utilizes a vision transformer encoder structure. In detail, the vision transformer encoder utilizes a D-dimensional latent vector $\tilde{f}_n \in \mathbb{R}^D$ projected by a 1×1 convolution in a C'-dimensional feature vector $f_n \in \mathbb{R}^{C'}$. In this case, by prepending the [class] token embedding vector $f_{cls} \in \mathbb{R}^D$, the following synthetic projected feature vectors are created.

$$\tilde{F} = [f_{cls}, \tilde{f}_1, \tilde{f}_2, \ldots, \tilde{f}_{H' \times W'}]$$

Position embedding $E_{pos}$ is added to $\tilde{F}$ in a shape of projected $\tilde{F}$.

$$Z^{(0)} = \tilde{F} + E_{pos}$$

This is applied to L consecutive vision transformer encoder layers as an input.

$$Z^{(l)} = \tau^{(l)}(Z^{(l-1)}), l = 1, \ldots, L$$

Where $Z^{(l)} = [z_0^{(l)}, z_1^{(l)}, \ldots, z_{H' \times W'}^{(l)}]$, and $\tau^{(l)}$ denotes the l-th encoder layer. The encoder layer has the same structure as that of the vison transformer including standard multi-head self-attention (MSA), multi-layer perceptron (MLP), layer normalization (LN), and residual connection. In this case, the first element of $Z^{(L)}$, $z_0^{(L)}$ denotes the vision transformer output feature vector in the [class] token, and by simply connecting the linear classifier to the classification head, the final diagnostic result for the CXR input image may be obtained.

For the interpretability of the classification model, in the inventive concept, a method of visualizing a feature map for the output calculating the relationship between the components of the vision transformer network may be used. In detail, in particular, unlike the existing approaches of the gradient propagation method or the attribution propagation method, which depends on heuristic propagation according to the attention graph or the acquired attention map, the method of the inventive concept uses a deep Taylor decomposition to calculate the local relevance and propagate it throughout the layer. This association propagation method is particularly useful for models based on the transformer architecture because the association propagation method can overcome the problems of self-attention and skip-connection.

In disease classification, only one transformer output vector at the [class] token position is used. The vision transformer outputs of the remaining positions produce vision transformer feature vectors associated with each block position. Because the severity is determined by both the local and overall manifestations of the disease, the vision transformer feature vectors of the remaining positions are used. Thus, as shown in FIG. 11, the outputs of the remaining positions are combined with an additional lightweight network to generate a COVID-19 severity map.

Figure 12:
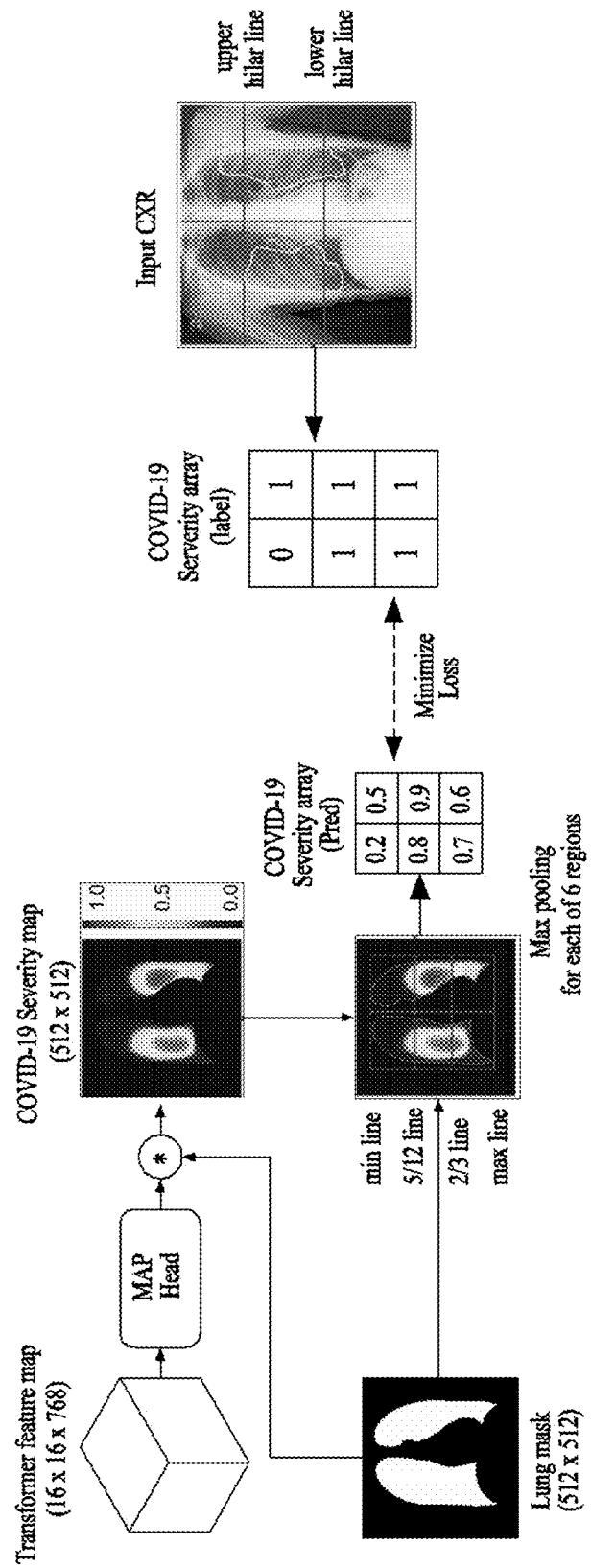
FIG. 12 is a view illustrating a comparison of the quantification of the severity of the lesion on a chest x-ray radiograph and a process of quantifying the severity by radiologists according to the inventive concept.

In detail, as shown in FIGS. 11 and 12, first, an output other than the position of the [class] token is extracted from the vision transformer output $Z^{(L)}$.

$$Z_{res} = [z_1^{(L)} \ldots z_{H' \times W'}^{(L)},]$$

This is used as the input of the map head network N.

$$S = N(Z_{res})$$

Then, the network output is multiplied pixel by pixel with the segmentation mask M and then a severity array $Y_{sev} \in \mathbb{R}^{3 \times 2}$ is generated by ROI max pooling.

$$Y_{sev} = RMP(S \otimes M)$$

Where ⊗ means Hadamard product. In detail, as shown in FIG. 12, the right lung and the left lung are divided into three areas of upper, middle, and lower areas based on 5/12 and 2/3 dividing lines, so that the lung is divided into a total of six areas. Next, the largest value within each of the six areas is assigned as the value of each element of the 3×2 severity array. Then, as shown in FIG. 9, the model is learned according to the severity label generated by radiologists and the loss calculated by the difference.

The data set used in the technique for quantifying the severity may be divided into three types of a data set for prior learning of the backbone, a data set for classification, and a data set for quantifying the severity.

Data set for prior learning of the backbone: For prior training of the backbone network to extract a low-level CXR function, the CheXpert data set, which includes 10 CXR findings, that is, pneumonia, consolidation, lung opacity, pleural effusion, cardiac hypertrophy, edema, atelectasis, pneumothorax, assistive devices, and no findings, may be used. 32,387 transverse viewing images obtaining a total of 224,316 CXR images from 65,240 insured people were excluded, so that 29,420 PA and 161,427 AP view data were available. Through the large number of CXRs, it is possible to train a powerful backbone network to the change of the subject which is one of the key strengths of the corresponding model.

Dataset for classification: Tables 4 and 5 summarize the datasets of PA and AP, respectively. To train and evaluate the vision transformer model, the inventive concept may use public data sets including infectious disease label cases such as data set of Valencia Regional Medical Imaging Bank (BIMCV), Brixia, and National Institutes of Health (NIH). In addition, data sets labeled by certified radiologists at Seoul Asan Hospital (AMC), Chungnam National University Hospital (CNUH), Yeungnam University Hospital (YNU), and Kyungbook National University Hospital (KNUH) may be included. The integrated data set, which combines the public and domestic data sets, is classified into three label classes, including normal, other infectious diseases (e.g., bacterial infectious disease, tuberculosis, and the like) and COVID-19 infection, considering the application in real clinical settings. In the case of PA images, three institutional data (CNUH, YNU, KNUH) as external institution test data sets are used as external institution test data sets to evaluate generalization performance in independent hospitals with different devices and settings. Meanwhile, in the AP, only the CNUH data set may be used as an external test data set because the CNUH data was the only data set including all three classes.

TABLE 4

Table 1. Summary of dataset resources and disease classes for PA view CXRs.

| PA view | Total | External test | | | Training and Validation | | | |
| --- | --- | --- | --- | --- | --- | --- | --- | --- |
| | | CNUH | YNU | KNUH | AMC | NIH | Brixia | BIMCV |
| Normal | 13,649 | 320 | 300 | 400 | 8,861 | 3,768 | — | — |
| Other infection | 1,468 | 39 | 144 | 308 | 977 | — | — | — |
| COVID-19 | 2,431 | 6 | 8 | 80 | — | — | 1,929 | 408 |
| Total images | 17,548 | 365 | 452 | 788 | 9,838 | 3,768 | 1,929 | 408 |

TABLE 5

Table 2. Summary of dataset resources and disease classes for AP view CXRs.

| AP view | Total | External test | Training and Validation | | | | | | |
| --- | --- | --- | --- | --- | --- | --- | --- | --- | --- |
| | | CNUH | YNU | KNUH | AMC | N1H | CheXpert | BXDchcst | Brixia | BIMCV |
| Normal | 14.507 | 97 | — | — | 117 | 3.390 | 9.500 | 1,310 | — | 93 |
| Other infection | 204 | 19 | 76 | 92 | 17 | — | — | — | — | — |
| COVID-19 | 3.334 | 75 | 278 | 213 | — | — | — | — | 2,384 | 374 |
| Total images | 18,045 | 191 | 354 | 305 | 134 | 3,390 | 9,500 | 1,310 | 2,384 | 467 |

Data set for severity quantification: Table 6 summarizes the data set and severity score of overall areas. Unlike classification, PA and AP view data may be integrated and utilized for the severity quantification task. This is because follow-up images of PA and AP may be obtained even from each single patient. For three institutional COVID-19 data sets (CNUH, YNU, KNUH), two board-certified radiologists may label severity on CXR images by using an array-based severity labeling scheme as shown in FIG. 12. In addition, the publicly available data Brixia data set may be utilized. The inventive concept may alternately use one institution data set as an external test set, and may evaluate the generalization performance for various institutions by training a model with the remaining two data sets together with the Brixia data set. In addition, for 12 COVID-19 images in the BIMCV data set, clinical experts zoned and marked COVID-19-related lesions. The performance may be qualitatively evaluated by comparing this label with the severity map generated by the model of the inventive concept.

TABLE 6

| Severity | Total | CNUH | YNU | KNUH | Brixia |
|---|---|---|---|---|---|
| 1 | 361 | 26 | 63 | 25 | 247 |
| 2 | 521 | 11 | 59 | 22 | 429 |
| 3 | 448 | 8 | 25 | 18 | 397 |
| 4 | 920 | 7 | 35 | 31 | 847 |
| 5 | 774 | 12 | 18 | 29 | 715 |
| 6 | 1,758 | 17 | 86 | 171 | 1,484 |
| Total | 4,782 | 81 | 286 | 296 | 4,119 |

Implementation Details and Evaluation Method

The CXR image may be pre-processed using histogram equalization, Gaussian blurring using a 3×3 kernel, pixel values may be normalize, and the CXR image may be finally sized to 512×512. The backbone network includes DenseNet-121 and the PCAM operation part when trained. Among the several layers of the intermediate feature map, a feature map with a size of 16×16×1024 may be used just before the PCAM operation. In the case of the vision transformer architecture, a standard transformer model having 12 layers and 12 heads may be used.

For the pre-training of the backbone network, an Adam optimizer having a learning rate of 0.0001 may be used, and a step scheduler having a batch size of 8 may train the backbone network through 160,000 optimization steps. For training the classification model, an SGD optimizer having momentum of 0.9 may be used together at a learning rate of 0.001. For training stabilization, the maximum gradient may be set to 1, and the model may be trained through 10,000 optimization steps using a cosine warm-up scheduler (warm-up step=500) having a batch size of 16. In addition, it is possible to train two separate classification models for PA and AP view images, respectively. For severity quantification, a map head having four upsizing convolution blocks is used, and followed by a sigmoid nonlinear function that normalizes the output in the [0-1] range after the last block. The training of the severity quantification model may be performed by using an SGD optimizer having a learning rate of 0.003 for 12,000 optimization steps with a constant learning rate, and a batch size of 4 may be used. Such optimal hyperparameters may be determined empirically.

As an evaluation index for the diagnostic performance of the classification model, the area under the receiver operating characteristic curve (AUC) may be used, but if possible, the sensitivity specificity and accuracy may be calculated after adjusting the threshold to meet the sensitivity value of 80% or more for each disease. Mean square error (MSE) may be used as the main indicator as an evaluation indicator for severity quantification, but the mean absolute error (MAE), correlation coefficient (CC), and R2 score may be measured and compared.

All experiments including preprocessing, development, and evaluation of the model may be performed on Nvidia Tesla V100 and RTX 3090 by using Python version 3.7 and PyTorch library version 1.7.

Diagnostic Performance and Model Interpretability Result for External Test Set

The diagnostic performance of the model for PA is shown in Table 7. The average AUCs of the model of the inventive concept of the three label classes (normal, other infections, COVID-19) are 0.932, 0.947 and 0.928, the sensitivity is 83.4%, 88.4% and 85.3%, the specificity is 84.2% and 86.8%, and the accuracy is 83.8% and 84.9%. This demonstrates the generalizability of the method of the inventive concept in the situation with different devices and settings. In the case of AP, the diagnostic performance of the model is shown in Table 8. The model of the inventive concept shows mean AUCs of 0.890, 0.880 and 0.828 for each of the three label classes, which are slightly reduced compared to the PA images, but still show high performance (>AUC 0.800) in the external test data set.

TABLE 7

| | External dataset 1 (CNUH) | | | | External dataset 2 (YNU) | | | | External dataset 3 (KNUH) | | | |
|---|---|---|---|---|---|---|---|---|---|---|---|---|
| Metrics | Avg. | Normal | Others | COVID | Avg. | Normal | Others | COVID | Avg. | Normal | Others | COVID |
| AUC | 0.932 | 0.938 | 0.926 | 0.931 | 0.921 | 0.947 | 0.908 | 0.907 | 0.928 | 0.955 | 0.908 | 0.921 |
| Sensitivity | 83.4 | 84.7 | 82.1 | 43.3 | 88.4 | 92.3 | 85.4 | 47.5 | 85.4 | 87.3 | 87.7 | 81.3 |
| Specificity | 85.3 | 88.9 | 88.3 | 78.6 | 44.2 | 90.4 | 82.5 | 79.3 | 86.8 | 89.4 | 82.1 | 44.3 |
| Accuracy | 83.8 | 85.2 | 87.7 | 78.6 | 84.9 | 91.8 | 83.4 | 79.4 | 86.9 | 88.3 | 84.3 | 88.1 |

TABLE 8

| | External dataset (CNUH) | | | |
|---|---|---|---|---|
| Metrics | Avg. | Normal | Others | COVID |
| AUC | 0.866 | 0.890 | 0.880 | 0.828 |

Figure 13A:
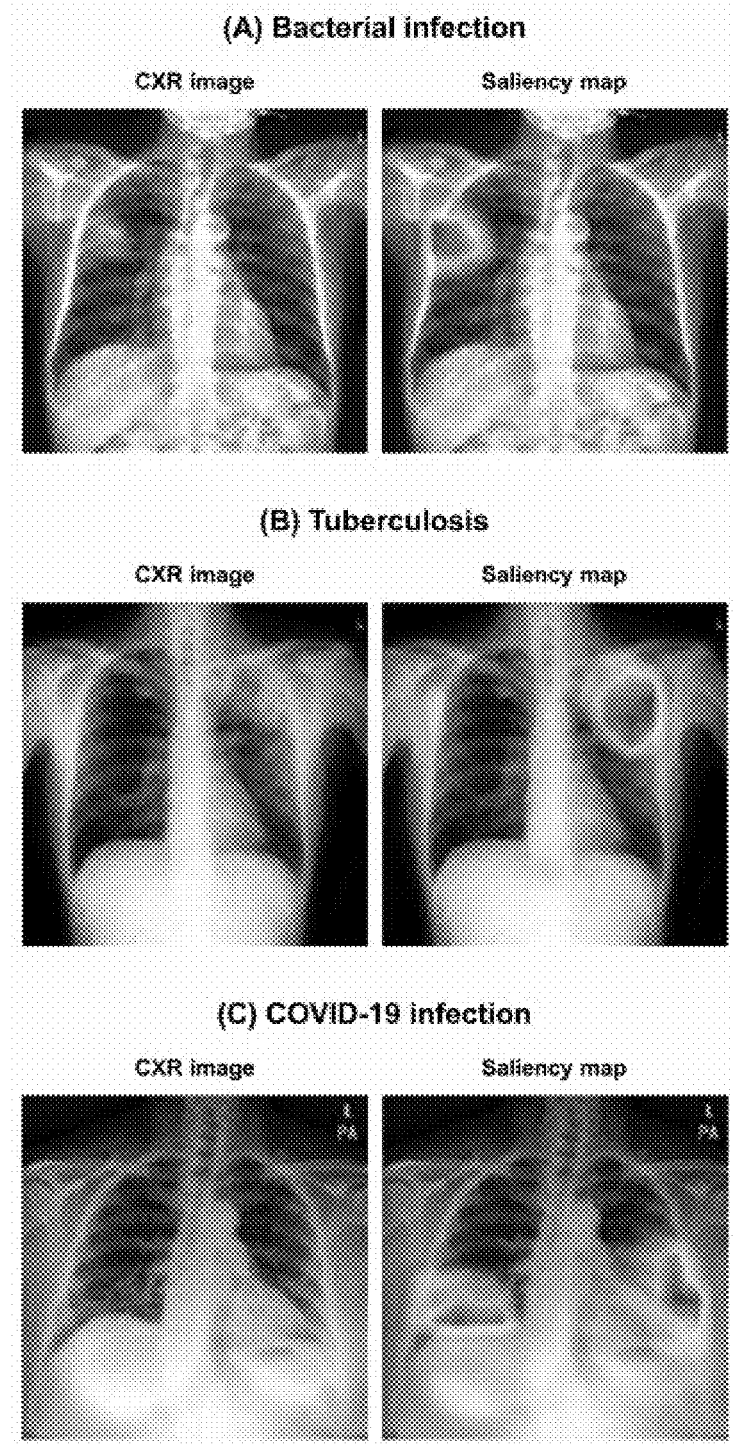
FIGS. 13A and 13B are views illustrating an example of quantifying the severity of a lesion and regionalizing the lesion on a chest x-ray radiograph according to the inventive concept.
Figure 13B:
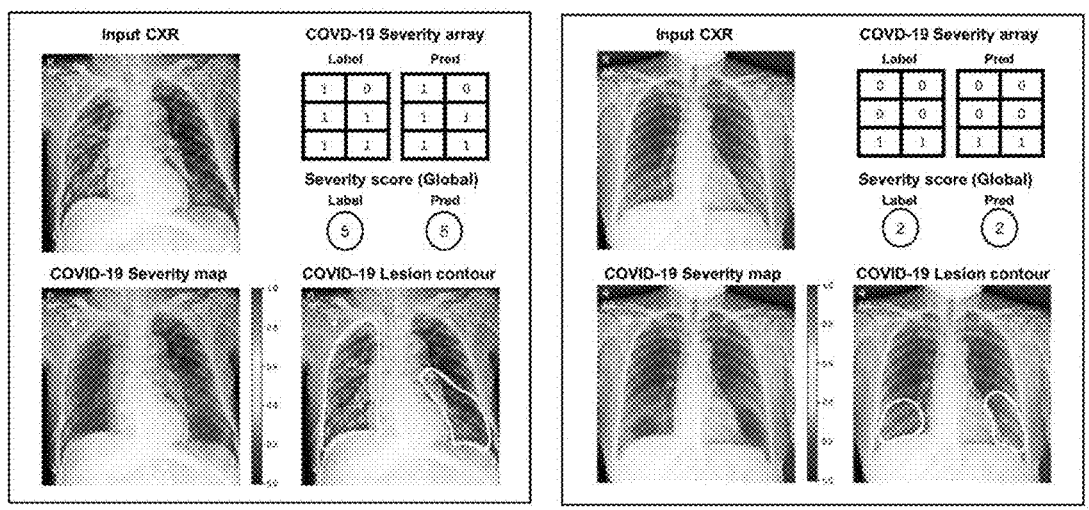

FIGS. 13A and 13B illustrate the visualization of a heat map for each disease class of an external test data set. As understood through FIGS. 13A and 13B, the model of the inventive concept shows a localized lesion of bacterial infection or tuberculosis. It may be also understood that it well catches lesions under both sides of the lung, as a general finding of COVID-19 pneumonia.

Severity Performance Result for External Test Set

The severity quantification results of the model are shown in Table 9. The model according to the inventive concept shows MSEs of 1.682, 1.677 and 1.607, MAEs of 1.028, 1.102 and 0.930, correlation coefficients of 0.781, 0.777 and 0.682, and R2 scores of 0.572, 0.572 and 0.432 in three external institutions. The Brixia data set includes 150 CXR images which are labeled with severity by 5 independent radiologists. In this case, the average MSE of the majority-consensus severity score and the severity score of each radiologist is 1.683. As a result, the MSEs of 1.657, 1.696 and 1.676 for the three external institutes of the model of the inventive concept means that the model of the inventive concept shows the performance of an experienced radiologist.

TABLE 9

| Metrics | External dataset 1 (CNUH) | External dataset 2 (YNU) | External dataset 3 (KNUH) |
|---|---|---|---|
| MSE | 1.682 | 1.677 | 1.607 |
| MAE | 1.028 | 1.102 | 0.930 |
| CC | 0.781 | 0.777 | 0.682 |
| $R^2$ | 0.572 | 0.572 | 0.432 |

Figure 14:
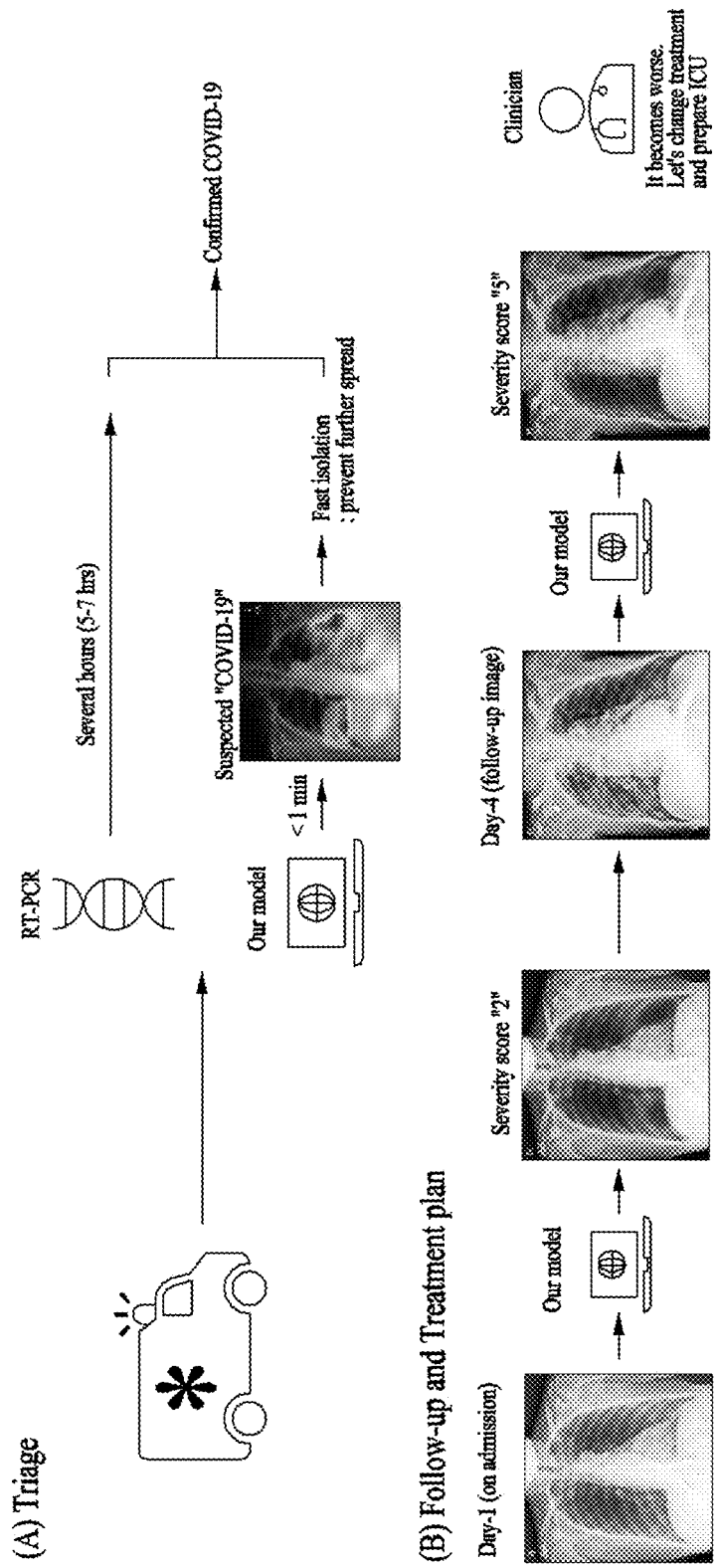
FIG. 14 is a view illustrating an example in which the apparatus for classifying lesions, quantifying the severity, and regionalizing the lesions on a chest radiographic image using the vision transformer according to the inventive concept can be used in actual clinical practice.

FIG. 14 shows an example of a prediction of a model including a COVID-19 severity score, a severity sequence, a severity map, and a lesion contour predicted in the CNUH data set, which is one of the external test data sets. It may be confirmed that the model of the inventive concept can not only reliably quantify the severity, but also help doctors by generating a severity map through which the location of the disease can be intuitively known.

Each of the above-described methods may be implemented as an apparatus, and each unit constituting the apparatus may include all contents described in the method.

Although the description of the device according to the inventive concept is omitted, each component constituting the device may include all the contents described in the method of the inventive concept, which will be apparent to those skilled in the art.

The foregoing devices may be realized by hardware elements, software elements and/or combinations thereof. For example, the devices and components illustrated in the exemplary embodiments of the inventive concept may be implemented in one or more general-use computers or special-purpose computers, such as a processor, a controller, an arithmetic logic unit (ALU), a digital signal processor, a microcomputer, a field programmable array (FPA), a programmable logic unit (PLU), a microprocessor or any device which may execute instructions and respond. A processing unit may implement an operating system (OS) or one or more software applications running on the OS. Further, the processing unit may access, store, manipulate, process and generate data in response to execution of software. It will be understood by those skilled in the art that although a single processing unit may be illustrated for convenience of understanding, the processing unit may include a plurality of processing elements and/or a plurality of types of processing elements. For example, the processing unit may include a plurality of processors or one processor and one controller. Also, the processing unit may have a different processing configuration, such as a parallel processor.

Software may include computer programs, codes, instructions or one or more combinations thereof and may configure a processing unit to operate in a desired manner or may independently or collectively control the processing unit. Software and/or data may be permanently or temporarily embodied in any type of machine, components, physical equipment, virtual equipment, computer storage media or units or transmitted signal waves so as to be interpreted by the processing unit or to provide instructions or data to the processing unit. Software may be dispersed throughout computer systems connected via networks and may be stored or executed in a dispersion manner. Software and data may be recorded in one or more computer-readable storage media.

The methods according to the above-described exemplary embodiments of the inventive concept may be implemented with program instructions which may be executed through various computer means and may be recorded in computer-readable media. The media may also include, alone or in combination with the program instructions, data files, data structures, and the like. The program instructions recorded in the media may be designed and configured specially for the exemplary embodiments of the inventive concept or be known and available to those skilled in computer software. Computer-readable media include magnetic media such as hard disks, floppy disks, and magnetic tape, optical media such as compact disc-read only memory (CD-ROM) disks and digital versatile discs (DVDs), magneto-optical media such as floptical disks; and hardware devices that are specially configured to store and perform program instructions, such as read-only memory (ROM), random access memory (RAM), flash memory, and the like. Program instructions include both machine codes, such as produced by a compiler, and higher level codes that may be executed by the computer using an interpreter.

According to embodiments of the inventive concept, a lesion of a chest x-ray radiograph such as COVID-19 may be classified based on data normalization and local patching.

According to embodiments of the inventive concept, the normalization scheme may be used to uniformly normalize the heterogeneity that occurs between unrefined data, thereby overcoming the bias of learning. In addition, various patch images may be obtained from one image in a local patch-based scheme to secure the diversity of images, so that it is possible to overcome the limitation of generalization occurring in a small data set. That is, the inventive concept may secure stable lesion classification performance by using less data, and more effectively visualize lesions exhibiting multiple patterns such as lung disease through the feature maps to which probabilistic weights are applied.

According to embodiments of the inventive concept, by effectively classifying infectious diseases through chest radiographic imaging, when used in the process of screening for infectious diseases, the spread of infectious diseases may be minimized and efficient distribution of medical resources may be expected. In addition, when considering the global demand for infectious disease screening treatment technology in preparation for potential infectious disease situations further from the current infectious disease situation, high added value may be created.

The inventive concept may be applied to a screening treatment process (Triage) in the medical market. By classifying not only normal patients but also patients with other diseases based on high sensitivity in the situation of infectious disease transmission, limited medical resources worldwide may be efficiently distributed. In addition, the inventive concept has the potential to be applied even in a new infectious disease situation that may occur again after the current infectious disease situation.

Because the chest x-ray imaging may be simpler and faster than other infectious disease diagnosis technologies, the chest x-ray imaging may be applied not only to the medical market but also to private facilities that lack specialized medical personnel. When the inventive concept is used as a screening treatment for infectious diseases in an environment where the population is dense, such as airports, military facilities, developing countries, and the like, while specialized medical resources are insufficient, it is possible to effectively block the indiscriminate transmission of infectious diseases in advance.

According to embodiments of the inventive concept, an algorithm for extracting a feature map using a large-scale simple chest x-ray radiograph data set established and refined before the plague epidemic, and a vision transformer algorithm for processing the feature map in a manner similar to word corpus in natural language processing are combined to classify lesions such as COVID-19 in chest x-ray radiographs, quantify the severity of the lesions, and localize the lesions.

According to embodiments of the inventive concept, a feature map extraction algorithm is first learned using a public large-scale simple chest x-ray radiograph data set of about 200,000 constructed before the epidemic. The feature map extraction algorithm is learned to classify low-level features (e.g., lung shadows, edema, and the like) using the labeled data of the large-scale simple chest x-ray radiograph data set. Because the large-scale learning data set used in this process is an image of a refined multi-organic data set, good generalization performance of the feature map extraction algorithm may be guaranteed in the unseen data set.

According to embodiments of the inventive concept, the vision transformer learns to produce the final diagnosis result by using the feature map extracted using the feature map extraction algorithm in a manner similar to a corpus in natural language processing, and in this process, a relatively small labeled data set is used for diagnosing infectious diseases on a simple chest x-ray radiograph. The final diagnosis result is made based on the extracted feature map, and because the feature map extraction algorithm is a model learned using large-scale data, it is possible to secure excellent generalization performance even though the algorithm is learned with a relatively small data set.

According to embodiments of the inventive concept, the vision transformer is learned to quantify the severity of COVID-19 by using the feature map extracted in a similar manner, and in this process, a small amount of data labeled with the severity of COVID-19 and the severity are not quantified, but excellent quantification performance may be secured even with low-severity labeling data by using and learning data labeled with COVID-19 infection in a self-training scheme.

According to embodiments of the inventive concept, the model from a label of a simple severity array rather than a severity segmentation label that requires a lot of time and labor is learned in a weakly supervised learning scheme, so that it is possible to predict the severity map and severity score showing excellent performance.

According to embodiments of the inventive concept, a method of visualizing a part with a high probability of having a lesion and a method of visualizing and showing the severity of COVID-19 infection are improved to be suitable to the developed vision transformer algorithm, so that it is possible to propose an effective visualization method.

The inventive concept may be applied to a triage in the medical market. By classifying patients with other diseases as well as normal patients based on high sensitivity in the transmission of infectious diseases, limited medical resources may be efficiently distributed worldwide. In addition, the inventive concept has the potential to be applied to new infectious disease situations that may occur again after the current infectious disease situation. In addition, the inventive concept may quantify the severity of a patient diagnosed as an infectious disease such as COVID-19 by using a simple radiographic image, so that the inventive concept may be usefully utilized in the process of follow-up and treatment plan decision of an already diagnosed patient.

The chest x-ray radiographic imaging may be applied not only in the medical market but also in private facilities lacking specialized medical personnel because the imaging scheme is simple and fast compared to other infectious disease diagnosis technologies. When the inventive concept is used as an infectious disease screening treatment in an environment where the population is dense, such as airports, military facilities, developing countries, and the like, but lacks specialized medical resources, it is possible to effectively block the reckless spread of infectious diseases in advance. In addition, in hospitals and living treatment centers, and the like, simple radiographic images are repeatedly taken for follow-up and treatment progress, and the present technology is used to quantify the severity of infectious disease patients, so that the inventive concept may be utilized in an environment where there are not enough clinical experts to read the images taken every time, so the inventive concept may be effectively used to determine the therapeutic effect and future treatment policy.

According to embodiments of the inventive concept, an organ area may be segmented from each of abnormal and normal lungs by using one neural network based on adaptive instance normalization in a chest x-ray radiograph.

According to embodiments of the inventive concept, because the organ area label generation in units of image pixels is costly and time-consuming, and specifically, the label is insufficient for abnormal lungs, first, a first adaptive instance normalization code for learning lung area segmentation in a normal lung based on a supervised learning technique in one integrated algorithm and converting an abnormal lung into a normal lung through a domain adaptation scheme may be learned. Then, by distilling the knowledge learned through supervised learning and domain adaptation into another second adaptive instance regularization code, it is possible to segment the normal lung and domain-transformed abnormal lung organs with good performance through self-supervised learning.

While a few exemplary embodiments have been shown and described with reference to the accompanying drawings, it will be apparent to those skilled in the art that various modifications and variations can be made from the foregoing descriptions. For example, adequate effects may be achieved even if the foregoing processes and methods are carried out in different order than described above, and/or the aforementioned elements, such as systems, structures, devices, or circuits, are combined or coupled in different forms and modes than as described above or be substituted or switched with other components or equivalents.

Thus, it is intended that the inventive concept covers other realizations and other embodiments of this invention provided they come within the scope of the appended claims and their equivalents.

What is claimed is:

1. A method of classifying a lesion of a chest x-ray radiograph, the method comprising:
    converting an input chest x-ray radiograph into a normalized image;
    segmenting the converted normalized image into an organ area by using a first neural network based on a pre-learned segmentation model;
    generating local patches for the segmented organ area; and
    classifying a lesion in the input chest x-ray radiograph by using a second neural network based on a pre-learned classification model for the generated local patches;

wherein the converting of the input chest x-ray radiograph includes converting the input chest x-ray radiograph into the normalized image by performing gamma correction in an image area and uniformly normalizing heterogeneity between data while emphasizing contrast between signal intensities of different organs by utilizing a feature of the gamma correction.

2. The method of claim 1, wherein the generating of the local patches includes:
generating an organ image for the segmented organ area by using the segmented organ area and the normalized image, and generating the local patches based on a lung area of the generated organ image.

3. The method of claim 1, wherein the classifying of the lesion includes
classifying a most classified lesion among lesion classification results for each of the generated local patches as a final lesion.

4. The method of claim 1, further comprising:
visualizing the classified lesion by applying a probabilistic weight to a Saliency map after obtaining the probabilistic weight from each of the local patches corresponding to the classified lesion.

5. The method of claim 4, wherein the visualizing of the classified lesion includes visualizing the classified lesion by using a gradient weighted class activation map.

6. The method of claim 1, wherein the segmenting of the converted normalized image includes:
segmenting the organ area from the normalized image by using the first neural network learned in advance with adaptive instance normalization.

7. The method of claim 1, wherein the first neural network learns a first adaptive instance normalization code for converting an abnormal lung into a normal lung in a domain adaptation scheme after learning lung area segmentation in a normal lung based on a supervised learning technique, and performs learning through a self-supervised learning scheme by distilling knowledge learned through the supervised learning and the domain adaptation scheme into a second adaptive instance normalization code, thereby integrating the domain adaptation and the segmentation to segment the organ area from each of the normal lung and the abnormal lung.

8. A method of classifying a lesion of a chest x-ray radiograph, the method comprising:
segmenting an input chest x-ray radiograph into an organ area by using a first neural network based on a pre-learned segmentation model;
generating local patches for the segmented organ area;
classifying a lesion in the input chest x-ray radiograph by using a second neural network based on a pre-learned classification model for the generated local patches; and
visualizing the classified lesion by applying a probabilistic weight to a Saliency map after obtaining the probabilistic weight from each of the local patches corresponding to the classified lesion.

9. An apparatus for classifying a lesion of a chest x-ray radiograph, the apparatus comprising:
a normalization unit configured to convert an input chest x-ray radiograph into a normalized image;
a segmentation unit configured to segment the converted normalized image into an organ area by using a first neural network based on a pre-learned segmentation model;
a generation unit configured to generate local patches for the segmented organ area; and
a classification unit configured to classify a lesion in the input chest x-ray radiograph by using a second neural network based on a pre-learned classification model for the generated local patches;
wherein the normalization unit is configured to convert the input chest x-ray radiograph into the normalized image by performing gamma correction in an image area and uniformly normalizing heterogeneity between data while emphasizing contrast between signal intensities of different organs by utilizing a feature of the gamma correction.

10. The apparatus of claim 9, wherein the generation unit is configured to generate an organ image for the segmented organ area by using the segmented organ area and the normalized image, and generate the local patches based on a lung area of the generated organ image.

11. The apparatus of claim 7, wherein the classification unit is configured to classify a most classified lesion among lesion classification results for each of the generated local patches as a final lesion.

12. The apparatus of claim 9, further comprising:
a visualization unit configured to visualize the classified lesion by applying a probabilistic weight to a Saliency map after obtaining the probabilistic weight from each of the local patches corresponding to the classified lesion.

13. The apparatus of claim 12, wherein the visualization unit is configured to visualize the classified lesion by using a gradient weighted class activation map.

14. The apparatus of claim 9, wherein the segmentation unit segments the organ area from the normalized image by using the first neural network learned in advance with adaptive instance normalization.

15. A method of classifying a lesion of a chest x-ray radiograph, the method comprising:
converting an input chest x-ray radiograph into a normalized image;
segmenting the converted normalized image into an organ area by using a first neural network based on a pre-learned segmentation model;
generating local patches for the segmented organ area;
classifying a lesion in the input chest x-ray radiograph by using a second neural network based on a pre-learned classification model for the generated local patches and classifying a most classified lesion among lesion classification results for each of the generated local patches as a final lesion; and
visualizing the classified lesion by applying a probabilistic weight to a Saliency map after obtaining the probabilistic weight from each of the local patches corresponding to the classified lesion.

16. The method of claim 8, wherein the visualizing of the classified lesion includes visualizing the classified lesion by using a gradient weighted class activation map.

17. The method of claim 15, wherein the visualizing of the classified lesion includes visualizing the classified lesion by using a gradient weighted class activation map.

18. A method of classifying a lesion of a chest x-ray radiograph, the method comprising:
segmenting an input chest x-ray radiograph into an organ area by using a first neural network based on a pre-learned segmentation model;
generating local patches for the segmented organ area; and
classifying a lesion in the input chest x-ray radiograph by using a second neural network based on a pre-learned classification model for the generated local patches;

wherein the first neural network learns a first adaptive instance normalization code for converting an abnormal lung into a normal lung in a domain adaptation scheme after learning lung area segmentation in a normal lung based on a supervised learning technique, and performs learning through a self-supervised learning scheme by distilling knowledge learned through the supervised learning and the domain adaptation scheme into a second adaptive instance normalization code, thereby integrating the domain adaptation and the segmentation to segment the organ area from each of the normal lung and the abnormal lung.

* * * * *